(12) United States Patent
Smith

(10) Patent No.: US 7,290,771 B2
(45) Date of Patent: Nov. 6, 2007

(54) BELLOWS SEALS FOR THERMOACOUSTIC DEVICES AND RECIPROCATING MACHINERY

(75) Inventor: Robert W. M. Smith, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 85 days.

(21) Appl. No.: 11/116,636

(22) Filed: Apr. 28, 2005

(65) Prior Publication Data

US 2005/0189727 A1 Sep. 1, 2005

Related U.S. Application Data

(63) Continuation-in-part of application No. 10/942,417, filed on Sep. 16, 2004, now Pat. No. 7,055,332, which is a continuation of application No. 10/409,855, filed on Apr. 9, 2003, now Pat. No. 6,792,764, said application No. 11/116,636 is a continuation-in-part of application No. 10/791,497, filed on Mar. 2, 2004, now Pat. No. 7,143,586, which is a continuation of application No. 10/410,492, filed on Apr. 9, 2003, now Pat. No. 6,725,670.

(60) Provisional application No. 60/565,976, filed on Apr. 28, 2004, provisional application No. 60/445,866, filed on Feb. 6, 2003, provisional application No. 60/371,967, filed on Apr. 10, 2002, provisional application No. 60/372,008, filed on Apr. 10, 2002.

(51) Int. Cl.
*F16J 3/00* (2006.01)
*F16J 15/52* (2006.01)

(52) U.S. Cl. .................................. 277/634; 277/636

(58) Field of Classification Search ........ 277/634–636; 464/173–175
See application file for complete search history.

(56) References Cited

U.S. PATENT DOCUMENTS

| 2,333,401 A | | 11/1943 | Woods | |
|---|---|---|---|---|
| 2,551,505 A | | 5/1951 | Olson, Jr. | |
| 2,605,099 A | | 7/1952 | Brown | |
| 3,186,722 A | * | 6/1965 | Johnston | 277/324 |
| 3,612,549 A | * | 10/1971 | Berkowitz | 277/410 |
| 3,866,440 A | * | 2/1975 | Stananought | 464/175 |
| 3,990,490 A | * | 11/1976 | Voelz | 141/311 R |
| 4,043,546 A | | 8/1977 | Ashfield et al. | |

(Continued)

OTHER PUBLICATIONS

Becht IV, Charles, "The Effect of Bellows Convolution Profile on Stress Distribution and Plastic Strain Concentration," PVP-vol. 401, Fitness for Service, Stress Classification and Expansion Joint Design—ASME 2000.

(Continued)

*Primary Examiner*—Patricia Engle
*Assistant Examiner*—Gilbert Lee
(74) *Attorney, Agent, or Firm*—Gifford, Krass, Sprinkle, Anderson & Citkowski, P.C.

(57) ABSTRACT

A bellows has an elongated bellows body defined by a flexible wall. The wall encloses a volume and extends between a first end and a second end. The body has a cross-sectional shape and a cross-sectional dimension that are generally constant between the first and second ends. The wall has an axial stiffness and an axial linear mass density. The stiffness and/or density varies generally monotonically between the first and second ends of the bellows body.

36 Claims, 15 Drawing Sheets

U.S. PATENT DOCUMENTS

| | | | |
|---|---|---|---|
| 4,086,825 A * | 5/1978 | Badcock et al. ............... 74/492 |
| 4,345,772 A * | 8/1982 | Woody et al. ............... 277/634 |
| 4,513,946 A * | 4/1985 | Priese ........................ 251/173 |
| 4,673,188 A * | 6/1987 | Matsuno et al. ............ 277/636 |
| 4,911,482 A * | 3/1990 | Doat ........................... 285/226 |
| 4,923,432 A * | 5/1990 | Porter ........................ 464/175 |
| RE33,696 E | 9/1991 | Stevenson |
| 5,050,894 A * | 9/1991 | Merel et al. ................. 277/504 |
| 5,118,086 A | 6/1992 | Stevenson et al. |
| 5,308,230 A | 5/1994 | Moore |
| 5,439,035 A | 8/1995 | Dal Palùú Attilio |
| 5,772,413 A | 6/1998 | Oshidari |
| 5,813,234 A | 9/1998 | Wighard |
| 5,915,930 A | 6/1999 | McNaull |
| 6,237,922 B1 | 5/2001 | Armstrong |
| 6,382,079 B1 | 5/2002 | Webb |
| 6,725,670 B2 | 4/2004 | Smith et al. |
| 6,739,976 B2 * | 5/2004 | Glowacki et al. ........... 464/175 |
| 6,755,027 B2 | 6/2004 | Garrett |
| 6,792,764 B2 | 9/2004 | Poese et al. |
| 6,932,346 B1 * | 8/2005 | Hayward .................... 277/315 |
| 2002/0132676 A1 * | 9/2002 | Glowacki et al. ........... 464/175 |
| 2004/0262854 A1 * | 12/2004 | Matczak et al. ............ 277/635 |
| 2006/0066062 A1 * | 3/2006 | Sugiyama ................... 277/635 |

OTHER PUBLICATIONS

Smith, Robert W.M., "High Efficiency Two Kilowatt Acoustic Source for a Thermoacoustic Refrigerator," The Penn State University Applied Research Laboratory (Technical Report), Dec. 2000.

* cited by examiner

Surface Stress Due to Displacement (QW=0.5, QDT=1.0)

BELLOWS SEALS FOR THERMOACOUSTIC DEVICES AND RECIPROCATING MACHINERY

REFERENCE TO RELATED APPLICATIONS

This application claims priority from U.S. Provisional Patent Application Ser. No. 60/565,976, filed Apr. 28, 2004.

This application is also a continuation-in-part of U.S. patent application Ser. No. 10/942,417, Sep. 16, 2004, now U.S. Pat. No. 7,055,332 which is a continuation of U.S. patent application Ser. No. 10/409,855, filed Apr. 9, 2003, now U.S. Pat. No. 6,792,764, which claims priority from U.S. Provisional Patent Application Ser. No. 60/372,008, filed Apr. 10, 2002; 60/371,967, filed Apr. 10, 2002; and 60/445,866, filed Feb. 6, 2003.

This application is also a continuation-in-part of U.S. patent application Ser. No. 10/791,497, Mar. 2, 2004, now U.S. Pat. No. 7,143,586 which is a continuation of U.S. patent application Ser. No. 10/410,492, filed Apr. 9, 2003, now U.S. Pat. No. 6,725,670, which claims priority from U.S. Provisional Patent Application Ser. No. 60/372,008, filed Apr. 10, 2002; 60/371,967, filed Apr. 10, 2002; and 60/445,866, filed Feb. 6, 2003.

The entire content of each application and patent are incorporated herein by reference.

FIELD OF THE INVENTION

The present invention relates to bellows seals for reciprocating machinery.

BACKGROUND OF THE INVENTION

For purposes of this disclosure, a bellows is defined as any tube-like conveyances or compliant cavities with substantial compliance along the axis of motion, which provide a boundary over which a pressure difference can be maintained and which are intended in operation to undergo axial compression, as a desired part of their function. As such, this definition includes devices such as described in U.S. Pat. Nos. 6,237,922 and 6,755,027, the entire contents of both of which are incorporated herein by reference. This definition also include other devices not specifically named as bellows, as would be recognized by a person of skill in the art. "Conventional bellows" will be used to refer to bellows with essentially uniform stiffness properties along the axis of the bellows structure, as is well approximated by a number of identical repeated structural elements along the compression axis of the bellows. When referring to "formed bellows", aspects relevant to the sort of corrugated structures described by the Standards of the Expansion Joint Manufacturers are described. Bellows may be formed from a variety of materials, including metal and elastomeric material, and may be formed in a variety of ways.

The field of use of bellows seals on reciprocating pistons is quite old and well developed. In reciprocating machine applications, wherein part of the expected operation of the bellows is that it undergo axial compression and yet act as a piston seal at relatively high frequencies, problems associated with the relatively slow wave speed in bellows materials are a recognized issue, and various methods have been devised to compensate. (For a discussion of the problems, and methods to compensate see, for example. U.S. Pat. Nos. 3,875,806 to Brewster and U.S. Pat. No. 4,556,369 to Braun, wherein external devices are employed to stabilize the bellows and multiple attachments are made to the bellows, intermediate between the ends.)

The recognized problem can be summarized in this manner: bellows are designed to be compliant structures, and yet they have non-trivial mass, so that the propagation rate of a disturbance initiated at one end, traveling through the bellows is much slower than in the bulk media of which the bellows are constructed. As such, standing waves form and this causes stress distributions that are locally higher and different in distribution from what is observed in the static compression or extension case. In general, for applications in reciprocating machinery, it is desirable to ensure that the stresses in the bellows are minimized so that the part will have the greatest fatigue resistance, and thus a large lifetime.

SUMMARY OF THE INVENTION

The present invention provides a bellows with an elongated bellows body defined by a flexible wall. The wall generally encloses a volume and extends between a first end and a second end. The body has a cross-sectional shape and a cross-sectional dimension. The wall has an axial stiffness and an axial linear mass density. The cross-sectional shape and the cross-sectional dimension are generally constant between the first and second ends of the body. The axial stiffness and/or the axial linear mass density varies generally monotonically between the first and second ends.

DETAILED DESCRIPTION OF THE PREFERRED EMBODIMENTS

Figure 1:
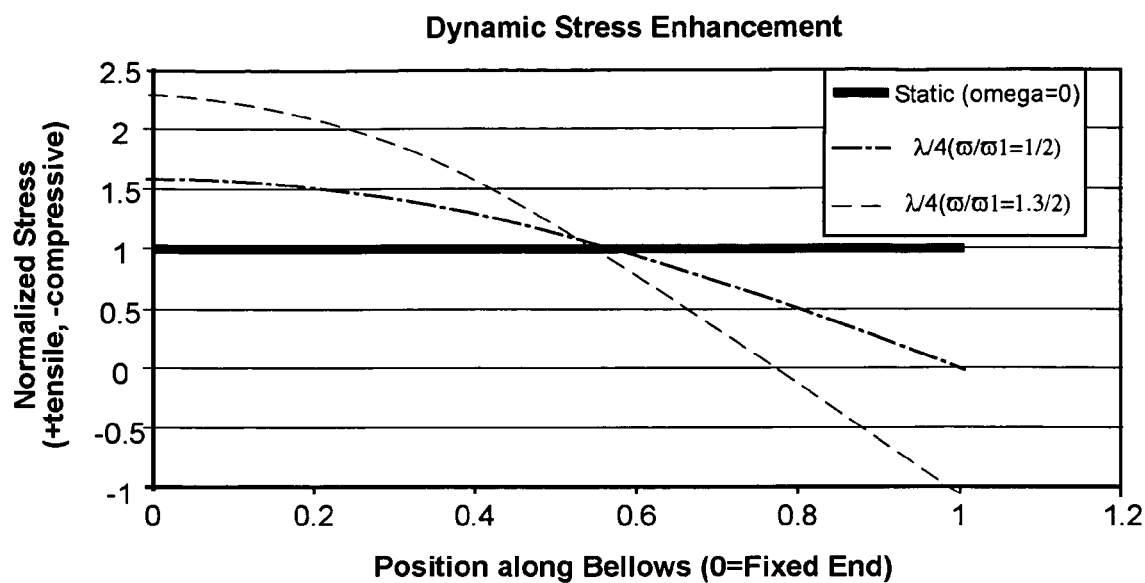
FIG. 1 is a graph showing dynamic stress enhancements for various bellows geometries.

The present invention is directed to an improvement on bellows seals such as employed in thermoacoustic devices, including those shown in U.S. Pat. Nos. 6,792,764 and 6,725,670, the entire contents of both of which are incorporated herein by reference. These machines, by their nature, most often operate over a modest frequency range. The improvement can be achieved by means of producing a bellows with an axial stiffness and/or axial linear mass density (mass per unit length) which varies monotonically from the fixed end, where it is highest, to the moving end, where it is lowest. The resulting bellows can operate with lower stresses, or accept higher piston motion, than a comparative bellows of constant stiffness and or density. This improvement brings either higher fatigue resistance, or permits designs with higher power capacity and pressure ratios in thermoacoustic devices, which typically operate over a fairly narrow frequency range. Similar advantages may be conveyed upon other reciprocating machinery designed to couple mechanical reciprocating motion or work into fluids or gases, for example in pumps. A few examples of pumps which use bellows can be seen in U.S. Pat. Nos. 5,772,413; 5,308,230; and 5,915,930. When pumps are designed to operate over a modest frequency range, they may enjoy a benefit from the present invention. A further benefit provided by the present invention over prior art bellows, in these dynamic applications, is that the axial resonance frequencies of the structures are inherently non-integer multiples of each other. In practice, this means that when the structure is driven with a periodic forcing function (and therefore contains higher order harmonics in the forcing function), the higher order modes in the structure are not strongly excited, since their resonance frequencies do not fall on harmonics of the driving frequency. When such overlap occurs, it can lead to failure in the bellows seal due to excessive deflection at resonance in these higher order and weakly damped modes.

As used herein, "monotonically" varying or decreasing between the ends means that the value referred to has a particular magnitude at one end, a lower magnitude at the other end, and the continuous mathematical function which approximates the magnitude of the value between the ends decreases or remains constant as one advances from one end to the other. The magnitude of the value is non-increasing."

Use of such a continuous monotonic function to describe the equivalent value (stiffness or density) instead of the actual point by point stiffness (even as it may vary within a repeated structural element or due to manufacturing considerations) is in keeping with the fact that the dynamic behavior of the bellows can be modeled by such a function (describing the values) whenever the frequency is such that the wavelength associated with the excitation is large compared to highly localized variations in the structure. So long as the wavelength associated with the excitation frequency in a structure which consists of repeating structural elements is long compared to that of a single structural element, for purposes of modeling the dynamic behavior, the value of the function will be that associated with an equivalent value with an average value of density and stiffness within each element.

As such, it will be recognized that the local value of the function will include the dynamic effect associated with what may be a very wide range of stiffness, particularly within structural elements and at transitions, and yet this should not be viewed as comprising a non-monotonic variation in the function, so long as these variations are small compared to a wavelength. For example, in a structure which consists of alternating layers of very compliant material with very stiff material, the function which describes the effective stiffness and density of each repeating structural element can be a monotonic function, for purposes of modeling the dynamic behavior, while the point to point magnitude of the value may vary radically above and below that described by the monotonic function within a structural element or at a transition; the function which models the dynamic behavior shall be construed by this approach to be considered still monotonic.

Conventional bellows are designed to move in quasi-static or low frequency operation (such as for pressure sensors) but must also accommodate mechanical excitation by nuisance broadband vibration or particular frequencies, which are not part of the desired function of the bellows, but a substantial practical consideration. The range of applications and means to deal with vibrations can be seen for example in U.S. Pat. Nos. 2,333,401 and 6,382,079. In general, these applications tend to be designed to minimize the response of the bellows to high frequency external excitation, while permitting the bellows to continue to operate in its intended quasi-static operation.

For many applications, the effect of the pressure differential the bellows must maintain on the calculated fatigue life can be small when compared with the effects of deflection stresses. Some embodiments of the present invention reduce the effects of deflection stress. Depending to a great extent on the magnitude of the pressure differential across the bellows for a given application, and the resulting magnitude and temporal phasing of the stresses in the bellows material associated with such pressures, and the particular geometry of the bellows, the combined impact of deflection and pressure for a particular end use must be contemplated, and this is ordinarily done by those skilled in the art. Since such pressure stresses must be included in the analysis, and they vary from application to application, a single optimal solution to reducing the deflection stresses does not exist.

It has been recognized in published prior art that, for a given operating frequency and bellows geometry, an optimum bellows length exists. This section provides background on this material. For a thermoacoustic device such as shown in U.S. Pat. Nos. 6,792,764 and 6,725,670, one must accommodate the piston stroke, whose magnitude will be hereafter referred to as $2\Delta_{max}$, and one must design around an operating frequency of the device (and piston), denoted by $f$, in cycles per second. To develop the proper equations, one can begin with the overall spring constant of the bellows, and the mass, which as a practical matter are readily obtained for a given bellows. Since a conventional bellows consists of a number of repeated structural elements of equal mass and stiffness, we can approximate the bellows as a continuous system with an equivalent stiffness and mass per unit length. If k is the spring constant of a bellows of a given length, one may write Hooke's law, to obtain the Force F in a differential length element dy as $$F = k \frac{L}{dy} \cdot \frac{d\xi}{dy} dy. \qquad (A.1)$$

$\zeta$ represents the displacement of a differential bellows segment along the axis y of the bellows. L properly refers to the length of the segment of the bellows with convolutions for a formed bellows. Often an integral collar or other structural element with negligible relative compliance is attached to the bellows, which is not to be included in the proper bellows length L.

If the force in the spring is a function of position (i.e. a non-static condition), one can use the first term in a Taylor series expansion to find the net force on an element dy, $$F_{y1} - F_{y2} = \frac{dF}{dy} dy \qquad (A.2)$$

If we let $\mu$ be the bellows mass per unit length along the bellows axis, one can write Newton's second law for the element, after substituting for F from (A.1) into (A.2) to obtain the equation of motion for a general bellows segment:

$$\frac{d}{dy}\left(kL\frac{d\xi}{dy}\right) = \mu dy \frac{d^2\xi}{dt^2} \qquad (A.3)$$

Assuming operation at nominally a single frequency the solution to this equation is of the form:

$$\zeta = [A\sin(\kappa y) + B\cos(\kappa y)](\cos \omega t) \qquad (A.4)$$

where A and B can be evaluated from the bellows boundary conditions, $\kappa$ is the wavenumber and t is time. Frequency $f$ and effective compressional wave speed c are related to the $\kappa$ in the usual manner as:

$$\kappa = \frac{\omega}{c} = \frac{2\pi f}{\lambda f}. \qquad (A.5)$$

$$c = \sqrt{\frac{kL}{\mu}} = L\sqrt{\frac{k}{m_{bellows}}}$$

Now considering the application of a piston seal, we assume the bellows is fixed at one end, (y=0), and has a prescribed (time harmonic) displacement with a peak value $\Delta_{max}$, at the other end (y=L). It can be seen that for this set of conditions, the parameter B in equation (A.4) is zero; defining the end deflection to be $\Delta_{max}$ at the location y=L (the moving end of the bellows), one can obtain equation (A.6) by equating A in equation (A.4) to $\Delta_{max}$.

$$\xi = \frac{\Delta_{max}}{\sin\left(\frac{2\pi f}{2Lf_1}L\right)} \sin\left(\frac{2\pi f}{2Lf_1} y\right) \qquad (A.6)$$

where we have defined $f_1$, which would correspond to the first axial resonance in the bellows, and is given by:

$$f_1 = \frac{1}{2}\sqrt{\frac{k}{m_{bellows}}}. \qquad (A.7)$$

The strain is the derivative of the displacement, so that:

$$\frac{d\xi}{dy} = \frac{\Delta_{max}}{\sin\left(\frac{\pi f}{f_1}\right)} \left(\frac{\pi f}{Lf_1}\right) \cos\left(\frac{\pi f}{Lf_1} y\right). \qquad (A.8)$$

Maximum strain always occurs at y=0, where the bellows is fixed. Of course, stress is proportional to strain in this analysis; such a condition is also an implicit requirement for high cycle-fatigue resistance. One may take the ratio of the maximum strain, to the (uniform) strain that occurs in the static case (i.e., $\Delta_{max}/L$, which is static), to compute a dynamic strain (and therefore also stress) magnification factor:

$$\Phi_m \equiv \frac{\text{bellows maximum dynamic strain}}{\text{bellows static strain}} = \frac{\left(\frac{\pi f}{f_1}\right)}{\sin\left(\frac{\pi f}{f_1}\right)} \qquad (A.9)$$

For a compressional wave speed, c, in the bellows, one may differentiate equation (A.8) with respect to L:

$$\frac{d}{dL}\frac{d\xi}{dy} = -\Delta_{max}\kappa^2 \frac{\cos(\kappa L)}{\sin^2(\kappa L)}. \qquad (A.10)$$

Setting equation (A.10) to be equal to zero defines the optimum length L of the bellows in terms of stress, for a given end displacement, and bellows geometry. Thus, when L=$\lambda$/4, a minimum is reached in the strain, for a given compressional wave speed and end displacement; increasing or decreasing L from this length results in higher stresses. It is important to observe that in contrast to the static case, where the strain in the bellows can always be made smaller by increasing the length of the bellows, this is not true in the dynamic case. It should be noted that, in general, the optimum length for the uniform property conventional bellows did not in anyway depend on the particular configuration of the bellows; this is a completely general result, independent of the geometrical form or materials of construction of the bellows. FIG. 1 provides an illustration of bellows dynamic stress enhancement for a given bellows geometry length operated at several frequencies. The position along the length of the bellows has been normalized such that the end of the bellows is at unity (i.e. 1).

It can also be observed, in the analysis above, that the optimum value of the bellows length chosen to minimize the strain for a given end deflection leads to a bellows length which is ¼ of the wavelength of a compressional wave at the chosen operating frequency. For a bellows of this type, if instead of a perfectly sinusoidal drive, an arbitrary function with the same periodicity is chosen, it is well known that the driving function can be represented by an infinite Fourier series which has frequency components that correspond to integer fractions of the period. As such, the driving function will then contain harmonics, associated with non-linearities in the driving mechanism, with aspects of the drive control, or other aspects of the implementation. Practical examples that generate such harmonics could include such conditions as forcing the end of the bellows to move with an electrodynamic driver which, when driven with a perfectly sinusoidal voltage, has some non-linearity, or perhaps driving a linear transduction device with an only approximately sinusoidal voltage, as might be done with a pulse-width-modulation scheme, when driven by a switching amplifier. In the case when such harmonics are also contained within the forcing function, for an optimal bellows as described above, the harmonics of the drive will lie near resonances of the bellows structure itself (for example, a frequency component in the end displacement at twice the frequency will be able to excite the ½ wavelength mode of the bellows). When this is true, and these modes may be only weakly damped, as is often desired to reduce power consumption in the bellows itself, these harmonics in the driving function can lead to large deflections in the bellows, in addition to those associated with the fundamental frequency, described above. Improved bellows, according to some embodiments of the present invention, inherently do not have resonance frequencies which are integer multiples of their fundamental mode, and thus eliminate the above discussed potential failure mode.

One may observe, in FIG. 1, that the solution that minimizes the bellows stress results in a fairly non-uniform stress profile along the axis of the bellows. In the optimum solution, the bellows stress approaches zero near the moving end (the optimum case is indicated by the plot with the legend marking $\omega/\omega 1=\frac{1}{2}$). This indicates that one can obtain greater deflection at the end and/or lower stresses at the fixed point by producing a bellows that has a monotonically decreasing stiffness and/or linear mass density as one moves from the fixed end to the moving end. To implement this mathematically, one can return to equation (A.3), and consider solutions to that equation in which k and μ are functions of the location along the axis (y) of the bellows.

In general, it can be difficult to find closed form solutions to (A.3) when arbitrary variable coefficients are present; it is however possible to obtain numerical results for reasonably smooth variations in these parameters. In as much as the particular construction of the bellows and implementation of this combination of variable properties along the bellows axis influences the stresses, and thus the particular desired mathematical form, it is not possible to show a single mathematical relationship which will optimizes the stress to cover all possible cases of generalized bellows. As such, an optimum solution cannot be defined. Further, as noted above, interactions can exist in between the pressure stresses and the deflections stresses, and the exact magnitude of the former influences the desired mathematical form as well, such that optimization for deflection may not produce the optimum part for function. Nonetheless, it is clear from the description herein how improvements can be made for frequency optimized bellows, beyond the prior art, and the designer of a particular bellows configuration can appropriately superimpose additional stresses associated with pressure which are particular to the design of the bellows.

It should be noted that a bellows having a monotonically changing cross-sectional internal area, which varies from one end to the other, can also accomplish the goal of varying stiffness and mass. A bellows with a tapered internal cross-sectional area, from one end to the other can accomplish the goal of reducing stresses in a reciprocating application, if suitably designed, and examples of tapered bellows (for example camera bellows) exist in prior art. This variation in cross-sectional area can be a disadvantage in many applications, such as a thermoacoustic device, because a given motion at the small end of the bellows will produce lower volumetric velocity, for a given end displacement, in comparison with a bellows of generally uniform cross-sectional area, from one end to the other. Similar considerations occur in other applications, such as pumps. As such, the approach described herein focuses on means to accomplish optimization of bellows for single frequency operation in which the cross-sectional area preferably remains generally constant.

Design Approach for Bellows According to Some Embodiments of the Present Invention One aspect of the present invention is the provision of a design approach for bellows. Frequency optimized bellows, having uniform density and stiffness along the axis, and a length optimized for operating frequency serves both as a reference, for illustrations of the level of improvement to be obtained in examples given later, as well as a starting point for the design for any improved part. Beginning with such a design, the steps to be taken may be summarized as follows:

1) Functional relationships for stress, bellows axial stiffness and mass density relations (for static displacements) as a function of displacement and the bellows geometry/construction are extracted. These are unique to the particular bellows type chosen as well as the means used to achieve the desired property variation. In any generalized bellows, these functional relationships can be expressed, and are part of the established art.

2) Beginning with the relations established above, a stiffness and/or mass per unit length (linear mass density) profile is produced which can be expressed mathematically, as a function of distance along the bellows. The stiffness and/or density are arranged to be decreasing in magnitude from the fixed end of the bellows. Care should of course be taken that the stiffness and/or density not achieve physically impossible values over the length of the part (i.e. zero or negative values.).

3) Using the trial mathematical profile produced in step 2, equation (A.3) is solved numerically, to provide the displacement in the bellows as a function of length along the bellows. Boundary conditions are established such that at the fixed end the displacement is zero, and the moving end produces the required piston motion (i.e. the reciprocating machine output.) Many techniques exist to numerically evaluate this differential equation, and are know to practitioners in the art. In fact, many modern hand calculators have this capability.

4) The displacement as a function of distance along the bellows, obtained in step 3, is numerically differentiated, to produce the strain as a function of position in the bellows.

5) The appropriate relationship between strain and stress (established in step 1) is used to calculate the dynamic stress profile in the part.

6) The stress profile thus obtained is then examined for the maximum value of stress, and the stress profile. The practitioner may at this point evaluate the relative benefit, for a given profile, of the relative benefit/cost to achieve further reductions in stress, by various physically and practically realizable means of implementing the desired property variation, described by the trial mathematical formulation. If at any point the local stresses become higher than the equivalent prior art case, the indication is that the local stiffness in the bellows is substantially too low and/or remains too low over too long a length along the axis of the bellows. Phenomenologically, one can see that this can occur when the compressional wavespeed in the property tailored section becomes too slow, and strong wave effects are seen in the bellows, essentially of the type that resulted in the optimum length selection in the prior art.

For purposes of illustration, we consider here several illustrative examples, with the first two cases based upon formed bellows geometry, of the sort shown in the primary exemplary embodiment of the thermoacoustic device of U.S. Pat. No. 6,792,764. The third will describe a 'hoop-stack' type of approach, which will be described after the formed bellows type solutions.

Conventional formed bellows are described in detail in the Standards of the Expansion Joint Manufacturers Association. Even with such a bellows, a number of methods exist to vary the density and/or stiffness in the desirable way along the axis. As illustrative examples using bellows of this type, we consider cases of varying thickness in the material of which the bellows is made, since this method offers the greatest improvement in terms of stress reduction. As a practical matter, it is also possible to vary the convolution height, and by such means decrease the stiffness per unit length; doing so however also increases the mass per unit length, and the latter offsets some of the theoretical gain. Other approaches to varying axial stiffness and/or density may also be used.

Illustrative Example:

Formed Bellows with Tailored Material Thickness

Figure 2:
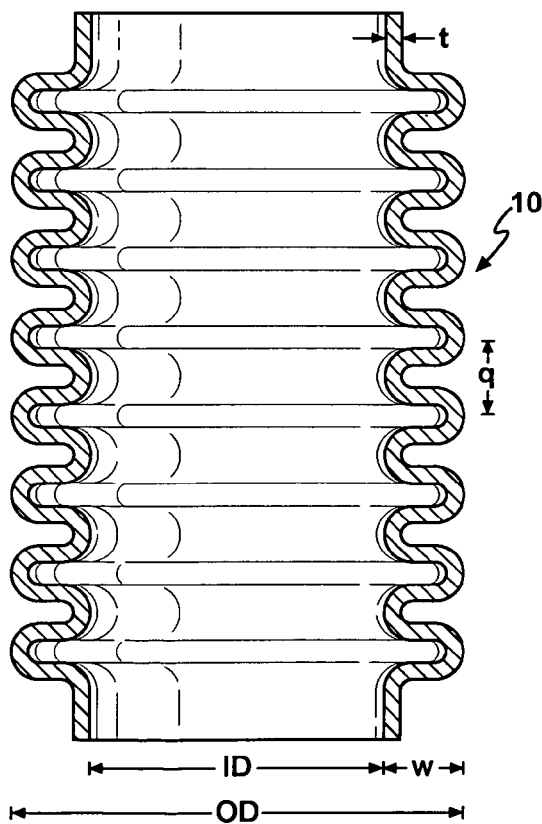
FIG. 2 is a cross-sectional view of a bellows with a corrugated wall.

Following the procedure outlined above, in order to illustrate the improvement on a formed bellows, the relationship in the stresses and stiffness of formed bellows geometries must be provided. A typical conventional formed bellows 10 is shown in FIG. 2, and can be fully characterized by 4 dimensions: the inside diameter (ID), the convolution height or span (w), the convolution pitch (q), and the material thickness (t). It should be noted that the material thickness (t) is illustrated thicker than typical, due to the difficulty in illustrating a thin wall.

Figure 3:
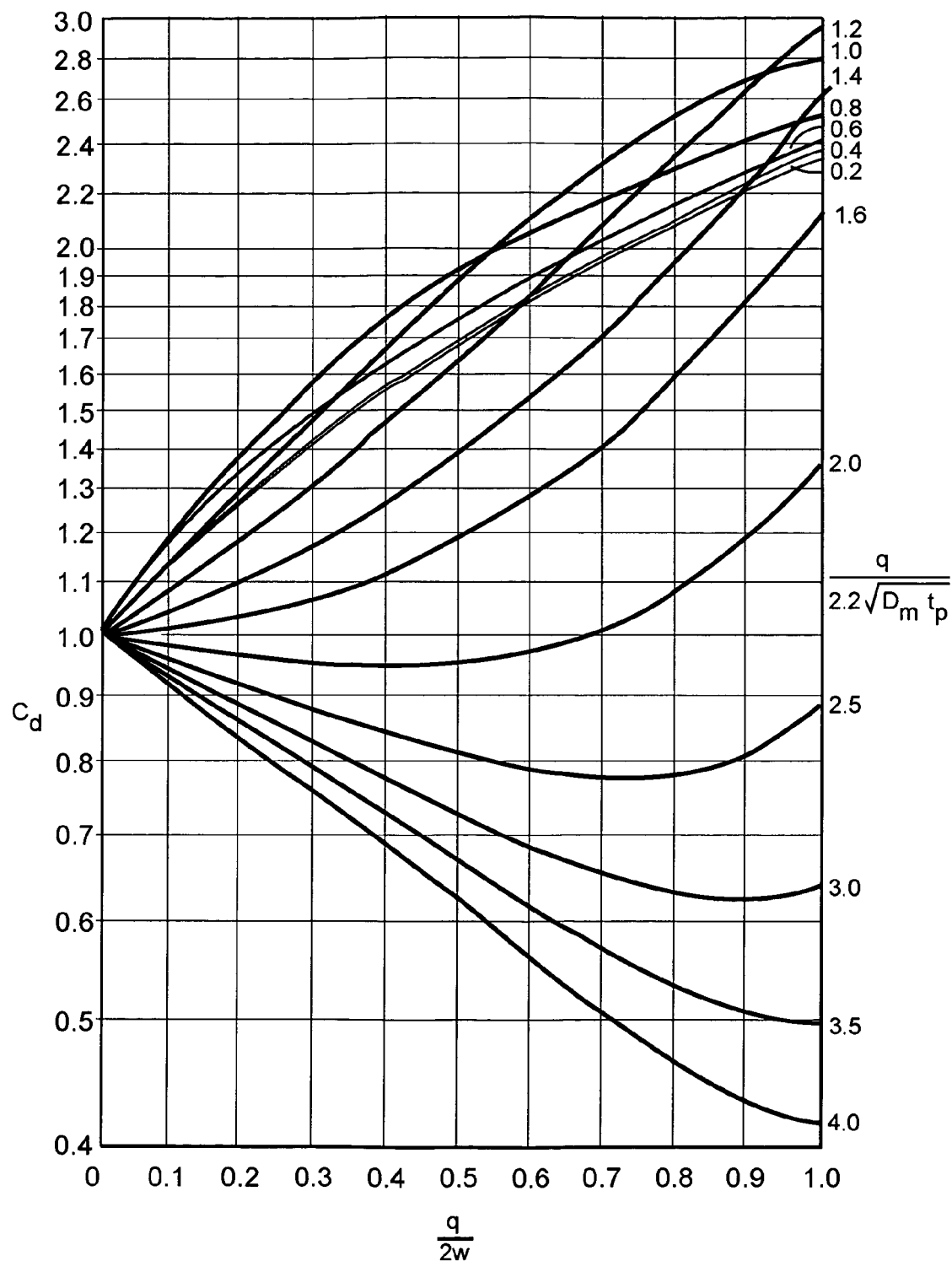
FIG. 3 is a graph showing values for a numerical factor useful in designing bellows.

The dominant deflection stresses in formed bellows are meridional bending stresses. This dominant stress in a particular convolution geometry can be obtained from:

$$\sigma = \epsilon q (5 E_b t / 3 w^2 C_D) \tag{A.11}$$

where $E_b$ is the modulus of the material. $C_D$ is a numerical factor based on two mathematically dimensionless groups of the four geometric variables that describe the bellows geometry. Stress is denoted by $\sigma$, and $\epsilon$ is the strain. For modest changes in the thickness of the bellows, the rate of change in $C_D$ can be fairly low, especially in geometries chosen to minimize deflection stress, wherein $C_D$ is near unity. So, for the analysis that follows, this contribution will be neglected, towards keeping the example cases understandable, although it could readily be included. FIG. 3, adapted from the EJMA standards, shows the relationship for $C_D$ as a function of the bellows geometry.

The stiffness of a single convolution can be characterized by $$k_{convolution} = 1.7 (D_m E_b t^3 / w^3 C_F) \tag{A.12}$$

Figure 4:
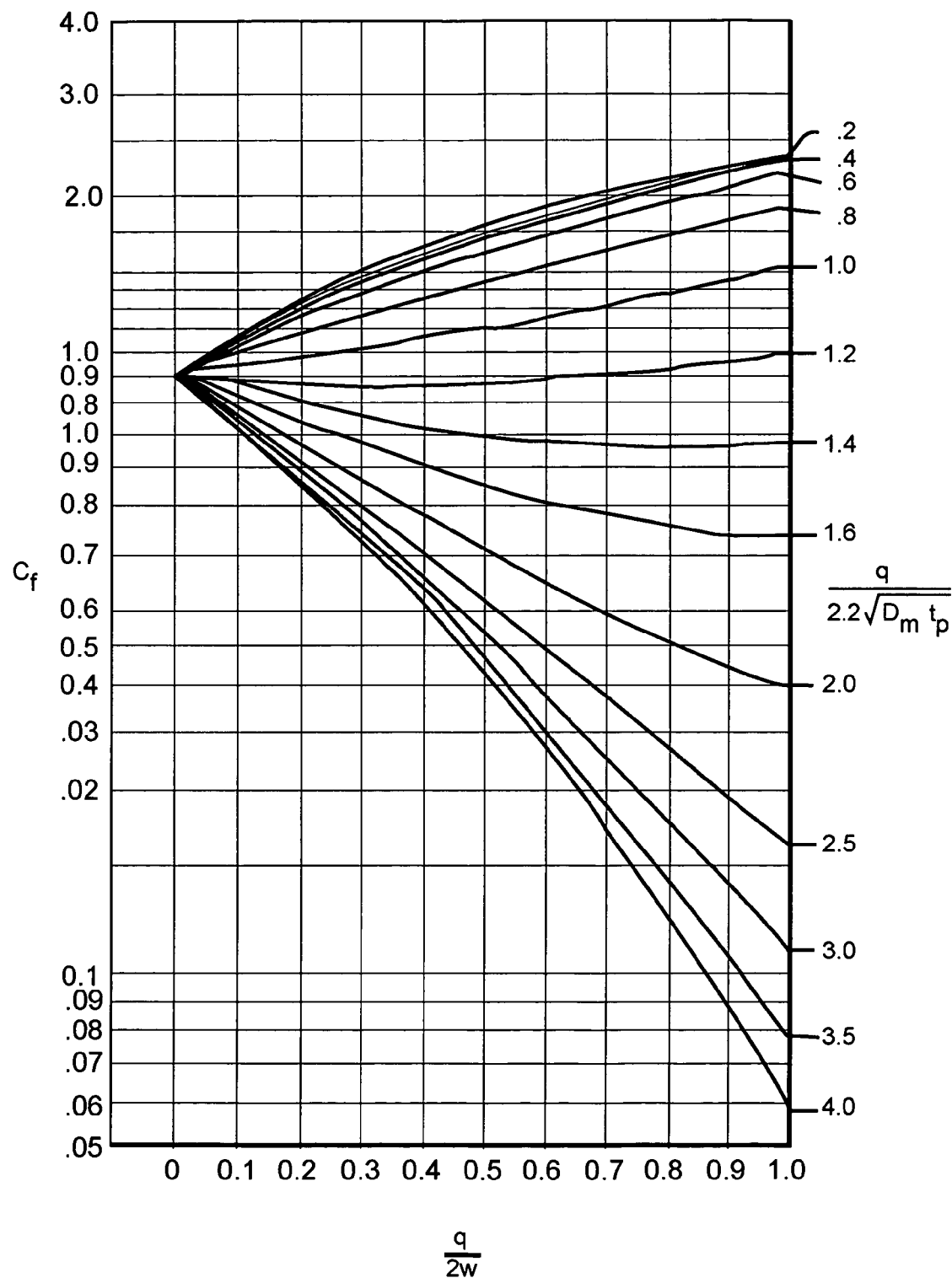
FIG. 4 is a graph showing values for another numerical factor useful in designing bellows.

FIG. 4, which is adapted from the EJMA Standards, shows values for $C_F$ as a function of the formed bellows geometry. As shown, $C_F$ is again a numerical factor, which tends to vary slowly, and $D_m$ is the sum of the bellows inside diameter, ID, and the convolution height—essentially a mean diameter. Again the impact of this numerical factor ($C_F$) will be neglected, for purposes of illustrating the method used to improve this geometry, although it could be included. One can calculate the mass of the bellows based upon the geometry and known material properties. We may note in particular, for purposes of tailoring and modeling the properties of the bellows, that since this example uses a formed bellows and the convolution pitch and height have been held constant, the mass of the convolution is simply proportional to its thickness.

Table 1, below, provides sample calculations for a formed bellows having a 6 inch inside diameter, a 7 3/16 inch outside diameter, 8 convolutions, and a constant wall thickness of 0.016 inches. For this example, the material used for the calculations was either Inconel® alloy 625 or 718, which are nickel based alloys. Other values and assumptions will be apparent from the Table. This baseline bellows has a geometry similar to the bellows 10 in FIG. 1, though with different dimensions and number of convolutions.

TABLE 1

Baseline Stress Computations

Normalized Data for 6 inch ID, 7 3/16 OD 8 convolution 0.016 inch thick bellows

| | | |
|---|---|---|
| $k := 566 \cdot \dfrac{4.45}{.0254}$ | | Bellows Equivalent Overall Stiffness |
| $l := 5.6 \cdot .0254$ | $l = 0.1422$ | Bellows Overall Length (meters) |

TABLE 1-continued

Baseline Stress Computations

| | |
|---|---|
| $m := \dfrac{1.33}{2.204}$ | Overall Bellows Mass (kg) |
| $\omega := 2 \cdot \pi \cdot 100$ | Operating Frequency (rad/sec) |
| $\rho_\omega := \left(\dfrac{m}{l}\right) \cdot \omega^2$ | Mass per unit length* omega^2 |
| $E_0 := k \cdot l \quad E_0 = 1.4105 \times 10^4$ | Stiffness per unit length for Constant Thickness Bellows As Described Above |
| $E(x) := E_0$ | Bellows Stiffness as a function of Length |
| $E(l) = 1.4105 \times 10^4$ | Bellows Equivalent End Stiffness |

Note: u is variable to describe displacement here
Numerical Solution of Boundary Value Problem, After Assumption of Harmonic Excitation Given
$u''(x) \cdot E(x) + \rho_\omega \cdot u(x) = 0$
$u(0) = 0 \qquad u(l) = .005$ — Boundary Values $\left(\left|\dfrac{E(l)}{E_0}\right|\right)^{.33} = 1$ — Bellows Moving End Thickness, Relative to Fixed End Thickness (Stiffness is proportional to thickness cubed)

Figure 5:
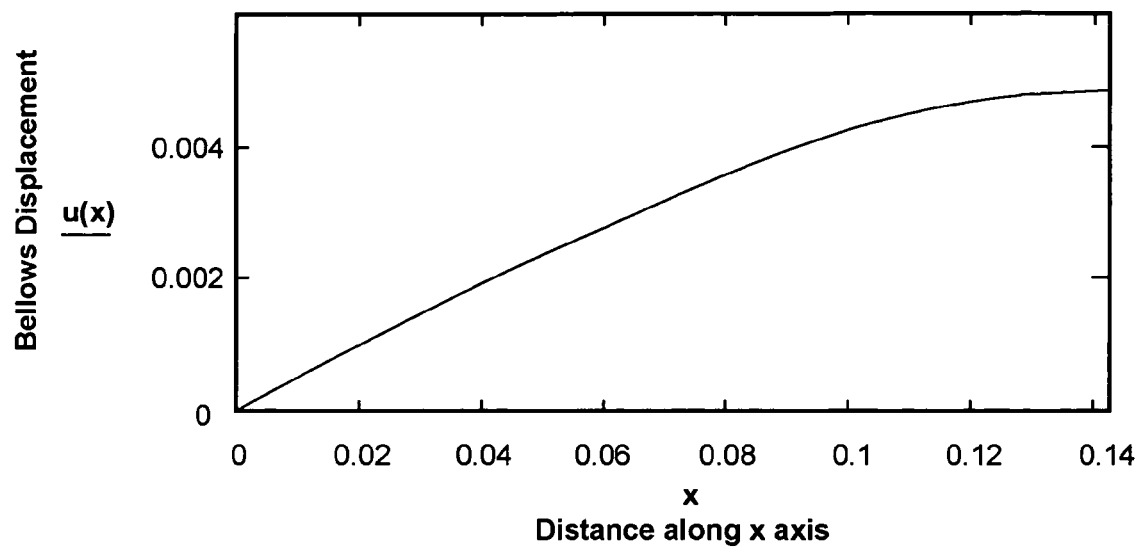
FIG. 5 is a graph showing bellows displacement versus position along the bellows.
Figure 6:
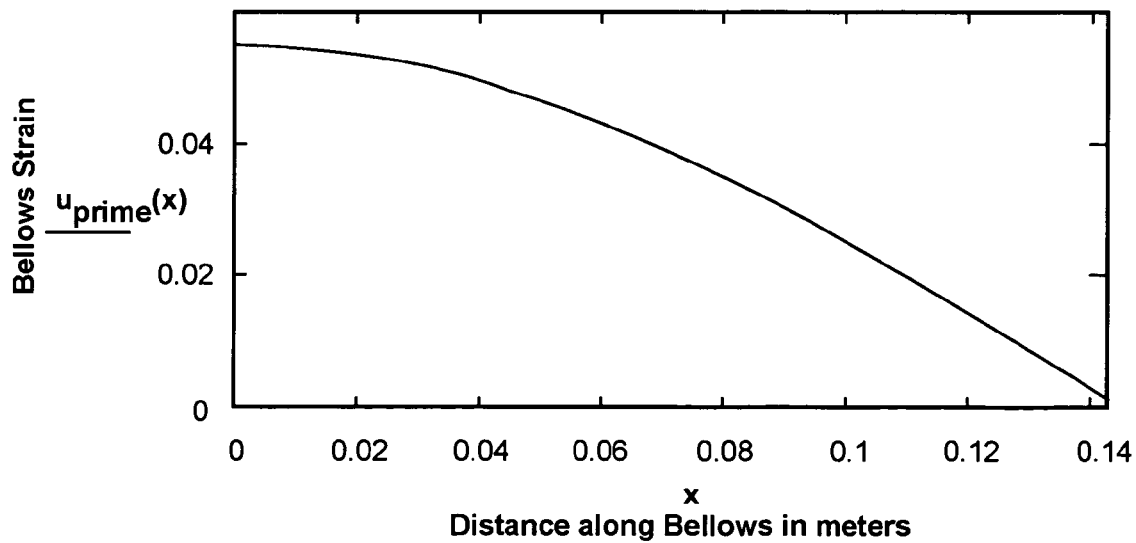
FIG. 6 is a graph showing bellows strain versus position along the bellows.

$u := \text{Odesolve}(x, .3, 10000) \qquad x := 0, .0001 \ldots (0.2)$ $u_{prime}(x) := \dfrac{u(x + .0001) - u(x)}{.0001}$ — Numerical Computation of Strain $u_{prime}(0) = 0.0544968$ — Strain at Fixed End of Bellows Using the data from Table 1, the bellows displacement and strain can be plotted versus the position along the bellows length. The displacement is shown in FIG. 5 and the normalized strain is shown in FIG. 6. As shown previously, the optimal bellows length results in the maximum stress at the fixed end at the attachment point, and this stress decreases in a cosine shaped curve to the end of the bellows. The normalized strain reaches a peak value at the fixed end, with a value of 0.0545, as shown in Table 1.

Bellows with Linearly Varying Stiffness

Figure 7:
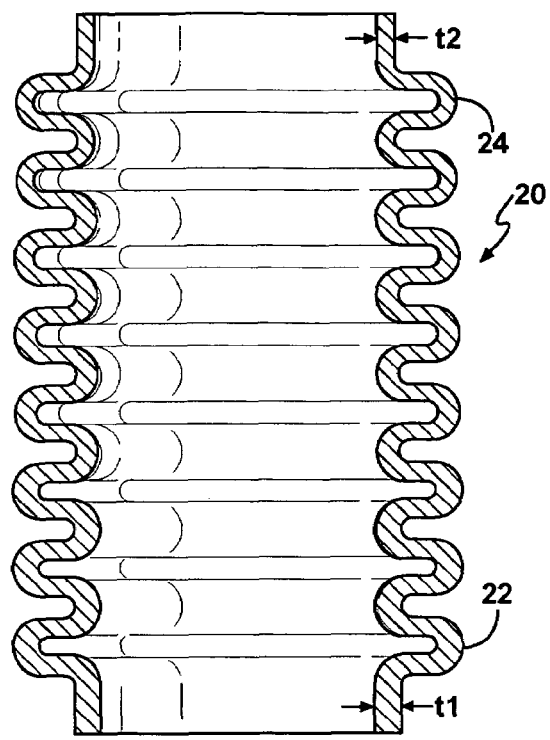
FIG. 7 is a cross-sectional view of a bellows according to an embodiment of the present invention with a wall thickness that varies.

We turn now to a bellows according to one embodiment of the present invention with linearly varying stiffness. As shown in FIG. 7, the bellows 20 has a wall thickness t1 at a first end 22 that is thicker than the wall thickness t2 at a second end 24. As one example, the wall thickness at the fixed end may be the same as the wall thickness of the bellows of Table 1, and the material thickness t decreases as $x^{1/3}$ toward the moving end, where it has half the thickness of the fixed end. The thicknesses are exaggerated in FIG. 7, since the exemplary thickness and decrease would not be visible in such a Figure without exaggeration. The thickness change results in a linearly decreasing stiffness profile, in distance along the axis, and a mass per unit length along the axis that changes as the thickness. The generalized stiffness is given by the variable E(x). In order to implement equation (A.3) with these variable coefficients, we require the derivative of the stiffness as a function of the length (given there as $E_{prime}(x)$). Exemplary calculations for such a bellows is provided in Table 2. "Normalized Stress" for this example is defined as calculated strain times thickness, with unit thickness assumed at the fixed end attachment, since for purposes of comparison all cases are the same at the fixed end (where the displacement is zero). Normalized stress expressed in this way is in keeping with the form of (A.11), since it can be seen that stress is proportional to the product of strain and thickness, and the other parameters are treated as constant. In this manner, the improvements realized by the approach taken in the exemplary embodiments will be directly observable numerically.

Bellows With Continuously Variable Stiffness and Density

Normalized Data for 6 inch ID, 7 3/16 OD 8 convolution 0.016 inch thick bellows

| | |
|---|---|
| $k := 566 \cdot \dfrac{4.45}{.0254}$ | Bellows Equivalent Overall Stiffness |
| $l := 5.6 \cdot .0254 \qquad l = 0.1422$ | Bellows Overall Length (meters) |
| $m := \dfrac{1.33}{2.204}$ | Overall Bellows Mass (kg) |

-continued

Bellows With Continuously Variable Stiffness and Density

| | |
|---|---|
| $\omega := 2 \cdot \pi \cdot 100$ | Operating Frequency (rad/sec) |
| $\rho_\omega := \left(\dfrac{m}{l}\right) \cdot \omega^2$ | Mass per unit length* omega^2 |
| $E_0 := k \quad 1$ $E_0 = 1.4105 \times 10^4$ $E_1 := -87000$ $E_2 := -0000$ $E_3 := 00000$ | Stiffness per unit length for Constant Thickness Bellows As Described Above Terms for Polynomial Expansion In Bellows Equivalent Stiffness: Note linear decrease in Stiffness as a function of length |
| $E(x) := E_0 + E_1 \cdot x + E_2 \cdot x^2 + E_3 \cdot x^3$ | Bellows Stiffness as a function of Length |
| $E(l) = 1.7298 \times 10^3$ | Bellows Equivalent End Stiffness |
| $E_{prime}(x) := E_1 + 2E_2 \quad x + 3E_3 \cdot x^2$ | Spatial Derivitive of Stiffness as a function of Length |

Note: u is variable to describe displacement here
Numerical Solution of Boundary Value Problem, After Assumption of Harmonic Excitation Given

| | |
|---|---|
| $u''(x) \cdot E(x) + u'(x) \cdot E_{prime}(x) + \rho_\omega \cdot \left(\left\|\dfrac{E(x)}{E_0}\right\|\right)^{\frac{1}{3}} \cdot u(x) = 0$ | Note Density Variation With thickness |
| $u(0) = 0 \qquad u(l) = .005$ | Boundary Values |
| $\left(\left\|\dfrac{E(l)}{E_0}\right\|\right)^{.33} = 0.5003$ | Bellows Moving End Thickness, Relative to Fixed End Thickness (Stiffness is proportional to thickness cubed) |
| u := Odesolve (x, .3, 10000) | x := 0, .0001 . . . (0.2) |
| $u_{prime}(x) := \dfrac{u(x + .0001) - u(x)}{.0001}$ | Numerical Computation of Strain |
| $u_{prime}(0) = 0.0333004$ | Strain Fixed End of Bellows |

Figure 8:
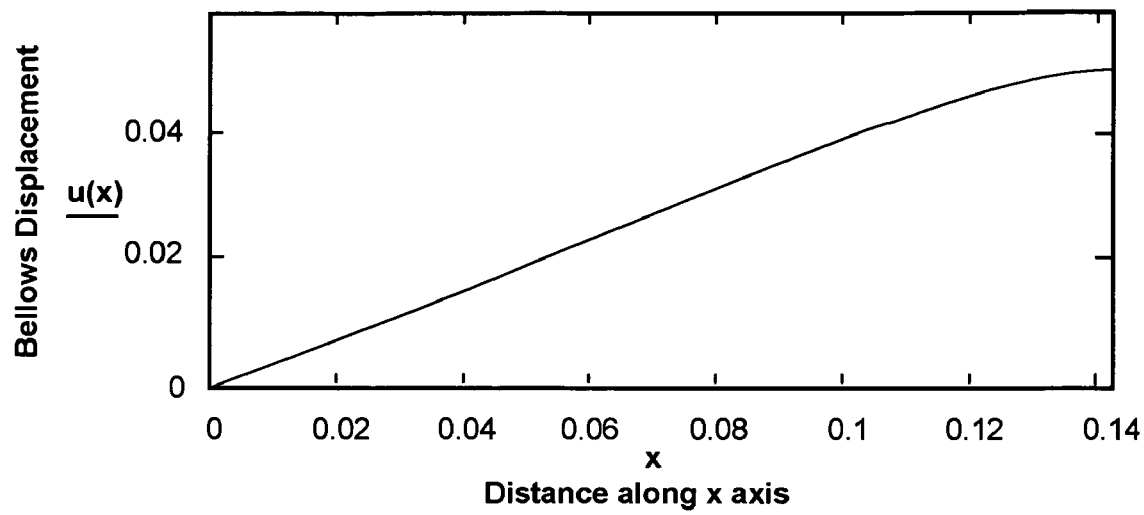
FIG. 8 is a graph showing bellows displacement versus position along the bellows.
Figure 9:
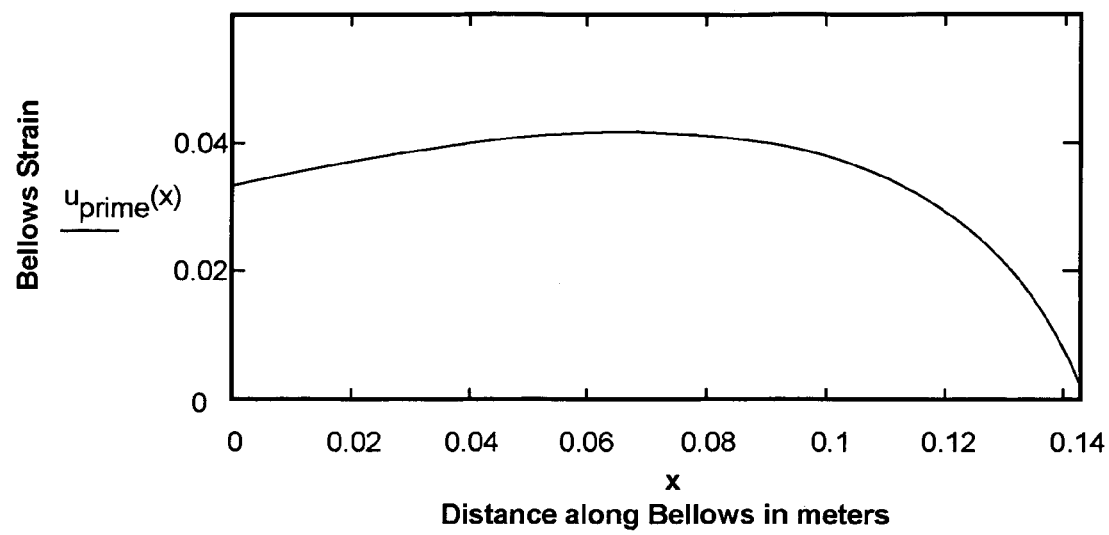
FIG. 9 is a graph showing bellows strain versus position along the bellows.
Figure 10:
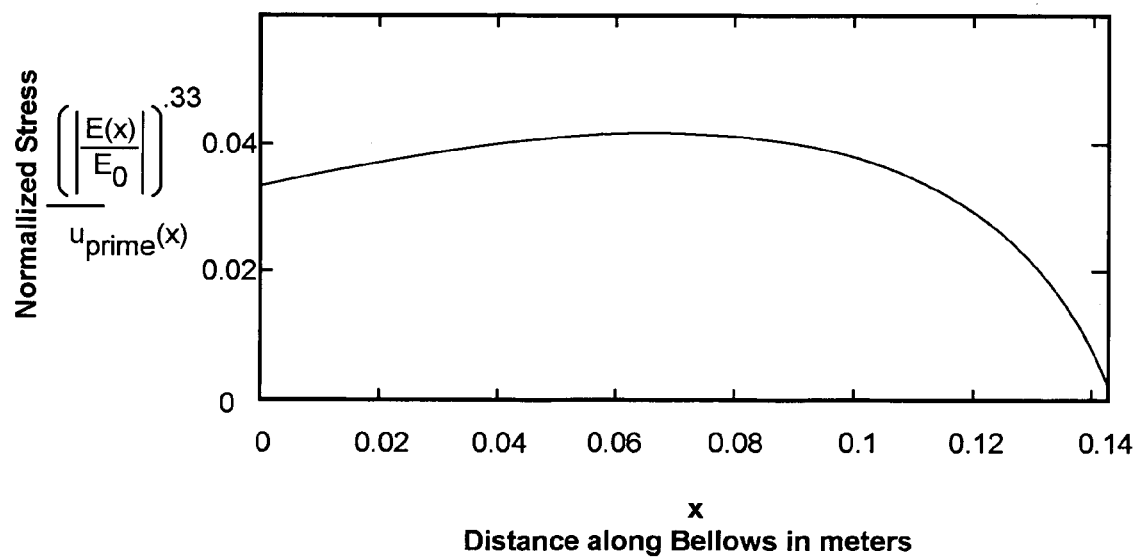
FIG. 10 is a graph showing normalized stress versus position along the bellows.

For the bellows 20, with the dimensions provided in Table 2, the displacement is shown in FIG. 8, the strain is shown in FIG. 9, and the normalized stress is shown in FIG. 10. As shown in FIG. 10, the maximum stress in the bellows 20, given by the product of the local strain and the local stiffness, no longer occurs at the fixed end, but at some intermediate point. One may note that the maximum normalized stress for this example is 0.0364, which is substantially improved over the values in Table 1, for a constant stiffness and thickness bellows 20. The stresses are ⅔ of the value seen in the Table 1. For this type of bellows, pressure stresses increase roughly as the square of the bellows thickness, and they too produce meridional bending stresses. As such, it may be attractive to have a profile which is not able to achieve constant stress throughout the length of the bellows, but wherein the stress decreases as one moves toward the moving end. This may provide some compensation for the increasing pressure stresses due to thinning of the formed bellows. The stress profile can be tailored, depending on the requirements, with suitable weighting and adjustment of the equivalent stiffness function which can be a polynomial expansion. Numerical evaluation shows that a linearly varying thickness performs better than a constant thickness bellows, but does not perform as well as the thickness profile in the example illustrated here. However, a linear varying thickness falls within the scope of the present invention.

Bellows with Incremental Stiffness and/or Density Variation

Figure 12:
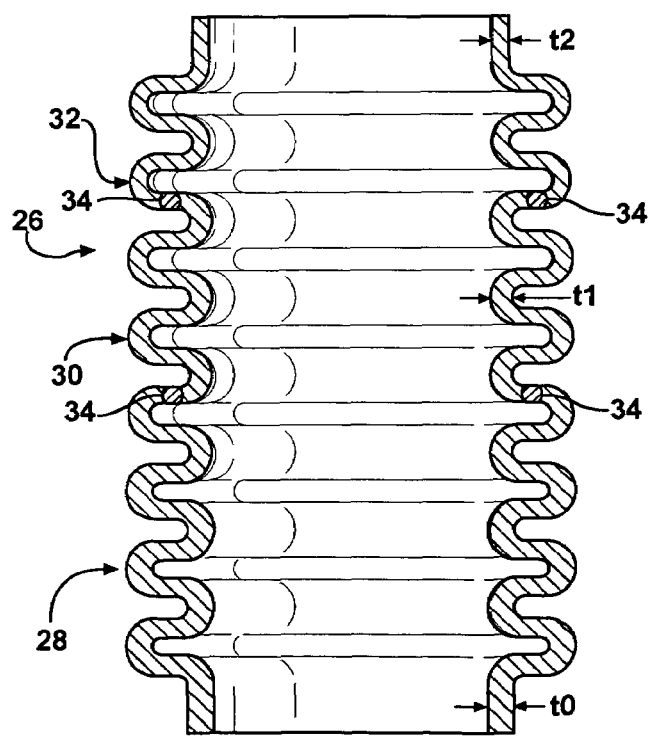
FIG. 12 is a cross-sectional view of a bellows according to another embodiment of the present invention, wherein different sections are joined end to end and have different thicknesses.

According to a further embodiment of the present invention, a bellows may be constructed with incremental stiffness and/or density variation. The bellows of FIG. 7 presents some difficulty in fabrication. Sheet material with a variable thickness profile for forming bellows 20 may not be readily available at low cost, at least in metallic materials. In this further exemplary embodiment of a bellows, the model consists of three sections of material of constant thickness, joined by welding or other processes. However, more or fewer sections may be used. Such a bellows 26 is shown in FIG. 12. This bellows has a first section 28, a second section 30, and a third section 32, joined longitudinally end to end. The first section has a thickness $t_0$, the second section has a thickness $t_1$ that is less than $t_0$, and the third section has a thickness $t_2$ that is less than $t_1$.

Figure 11:
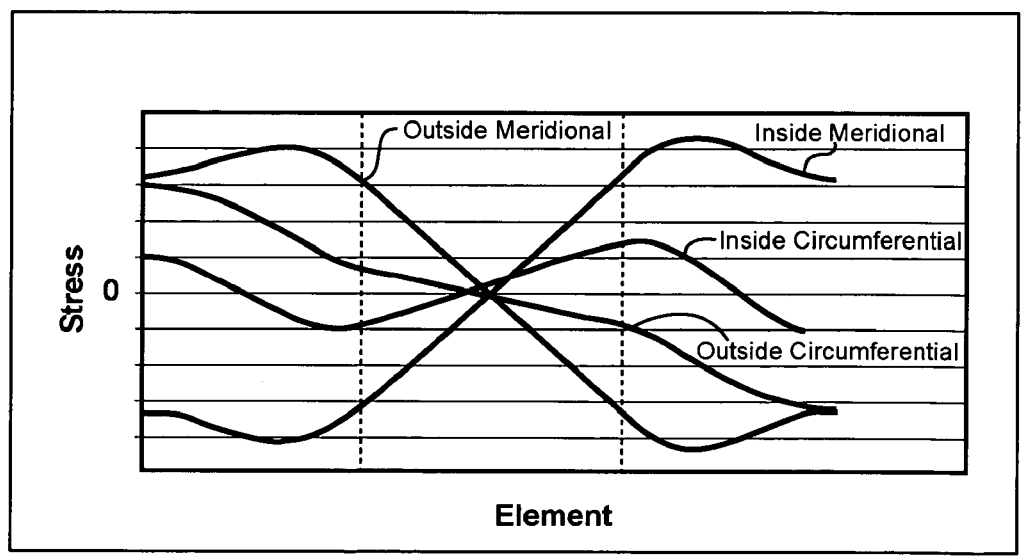
FIG. 11 is a graph showing bending stresses in a bellows.

It is known in formed bellows that the dominant stress, namely the meridional bending stress, has a zero crossing roughly midway between the crest and the root of the convolution. The bending stress associated with deflection of a bellows is illustrated in FIG. 11 (adapted from C. Becht, IV, "The Effect of Bellows Convolution Profile On Stress Distribution And Plastic Strain Concentration", *Fitness For Service, Stress Classification and Expansion Joint Design*, PVP-Vol 401, p 201-209, (American Society of Mechanical Engineers 2000)). The profiles show modeled stresses from one crest to one root in a formed bellows; the section between the dashed lines indicates the 'flat' portion of the convolution which has no curvature and is perpendicular to the compression axis of the formed bellows. Since this is a location of minimum bending stress associated with deflection, a joining weld my be placed in the material such that the weld will find this location during the forming operations, although the exactly optimal location of the placement of the weld within the convolution profile will be influenced by the relative thicknesses of the material. In some embodiments of the present invention, a joining weld is disposed in the "flat portion" of the convolutions, and may be positioned approximately halfway between the crest and root of the convolutions. Examples of such weld joints 34 are shown in FIG. 12

Figure 13:
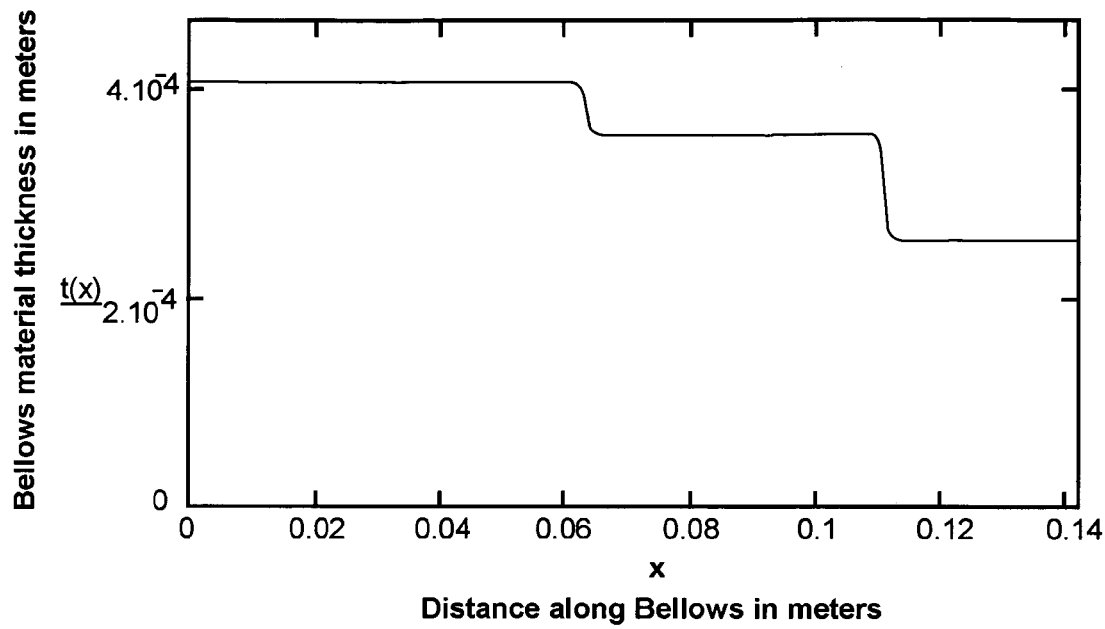
FIG. 13 is a graph showing bellows thickness versus position along the bellows.

Table 3 provides exemplary calculations for a bellows with incremental thickness changes according to an embodiment of the present invention. As before, the derivative of the stiffness of the bellows as a function of length is required, and a sharp discontinuity would produce a function which is numerically not possible to evaluate. A smoothing function has been applied, which in practice would be associated in part with the weld bead transition and smoothing provided by a planishing operation, as is typically performed on the longitudinal weld for conventional bellows formed of sheet material. For this example, modest iterative adjustments have been made in the relative thicknesses of the material, and transition locations to make the peaks in the stress profile approximately equal and of a magnitude which has a normalized value of 0.038, or 70% of the value shown in FIG. 6. The effective thickness profile of the material as a function of length is shown in FIG. 13. In this example, practical thickness increments for material were chosen, which are commercially available in sheet metal.

Bellows With Incremental Stiffness/Density Variation

Normalized to Data for 6 inch ID, 7 3/16 OD, 8 convolution, 0.016 inch thick bellows at attachment, stepping down to .014 inch thick and .010 inch thick.

$$k := 566 \cdot \frac{4.45}{.0254}$$ Bellows Equivalent Overall Stiffness $$l := 5.6 \cdot .0254 \quad l = 0.1422$$ Bellows Overall Length (meters)

$$l_1 := \left(\frac{4}{9}\right) \cdot l$$ First Thickness Transition $$l_2 := \left(\frac{7}{9}\right) \cdot l$$ Second Thickness Transition $$m := \frac{1.33}{2.204}$$ Overall Bellows Mass (kg)

$$\omega := 2 \cdot \pi \cdot 100$$ Operating Frequency (rad/sec)
$$w_t := .00039$$ Weld Transition Parameter $$\rho_\omega := \left(\frac{m}{l}\right) \cdot \omega^2$$ Mass per unit length* omega^2

Equivalent Stiffness, Thickness of Nominal Bellows Set Up of Differential Equation $$E_0 := k \cdot l$$
$$E_0 = 1.4105 \times 10^4$$
$$t_0 := .016 \cdot .0254$$ Bellows Initial Thickness (meters)
$$t_1 := .875 t_0$$ Bellows Thickness for mid-section
$$t_1 = 3.556 \times 10^{-4}$$
$$t_2 := .625 \cdot t_0$$ Bellow Thickness at End Section (Near Moving End)
$$t_2 = 2.54 \times 10^{-4}$$

Create Stepwise Thickness Profile $$t(x) := \left[\frac{(t_0 - t_1)}{\frac{(x - l_1)}{e^{w_t} + 1}}\right] + \left[\frac{(t_1 - t_2)}{\frac{(x - l_2)}{e^{w_t} + 1}}\right] + t_2$$

$$E(x) := E_0 \cdot \left(\frac{t(x)}{t_0}\right)^3$$

Expression of Bellows Convolution Equivalent Stiffness As a Function of Length: Stiffness is proportional to the material thickness cubed Derivitive of Stiffness as a Function of Length (Line Break Dummy Variable)
$$D(x) := \left[\frac{-(t_0 - t_1)}{\left[\exp\left[\frac{(x - l_1)}{w_t}\right] + 1\right]^2 \cdot w_t} \cdot \exp\left[\frac{(x - l_1)}{w_t}\right] - \frac{(t_1 - t_2)}{\left[\exp\left[\frac{(x - l_2)}{w_t}\right] + 1\right]^2 \cdot w_t} \cdot \exp\left[\frac{(x - l_2)}{w_t}\right]\right]$$

$$E_{prime}(x) := \left[3 \cdot E_0 \cdot \frac{\left[\frac{(t_0 - t_1)}{\left[\exp\left[\frac{(x - l_1)}{w_t}\right] + 1\right]} + \frac{(t_1 - t_2)}{\left[\exp\left[\frac{(x - l_2)}{w_t}\right] + 1\right]} + t_2\right]^2}{t_0^3}\right] \cdot D(x)$$

-continued

Bellows With Incremental Stiffness/Density Variation

Figure 14:
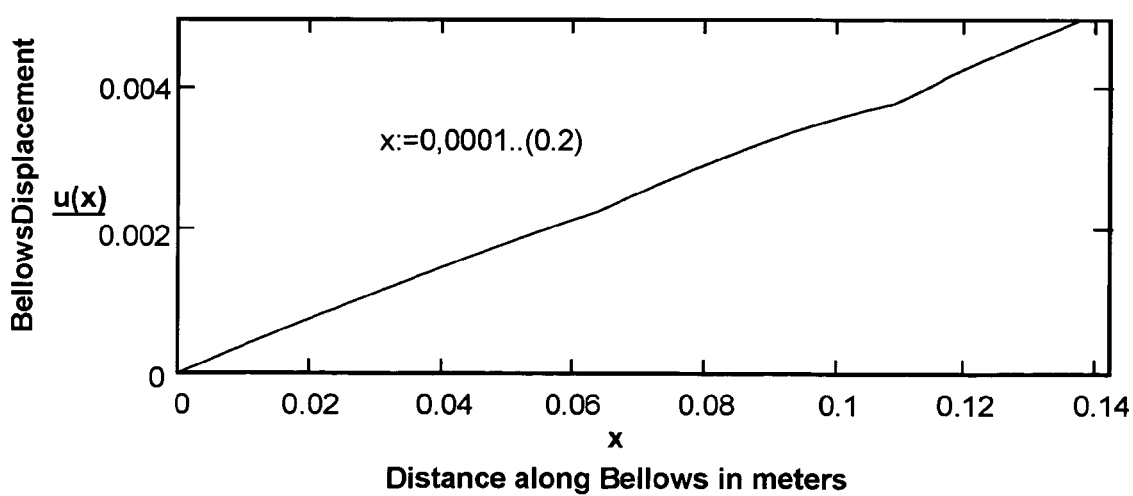
FIG. 14 is a graph showing bellows displacement versus position along the bellows.
Figure 15:
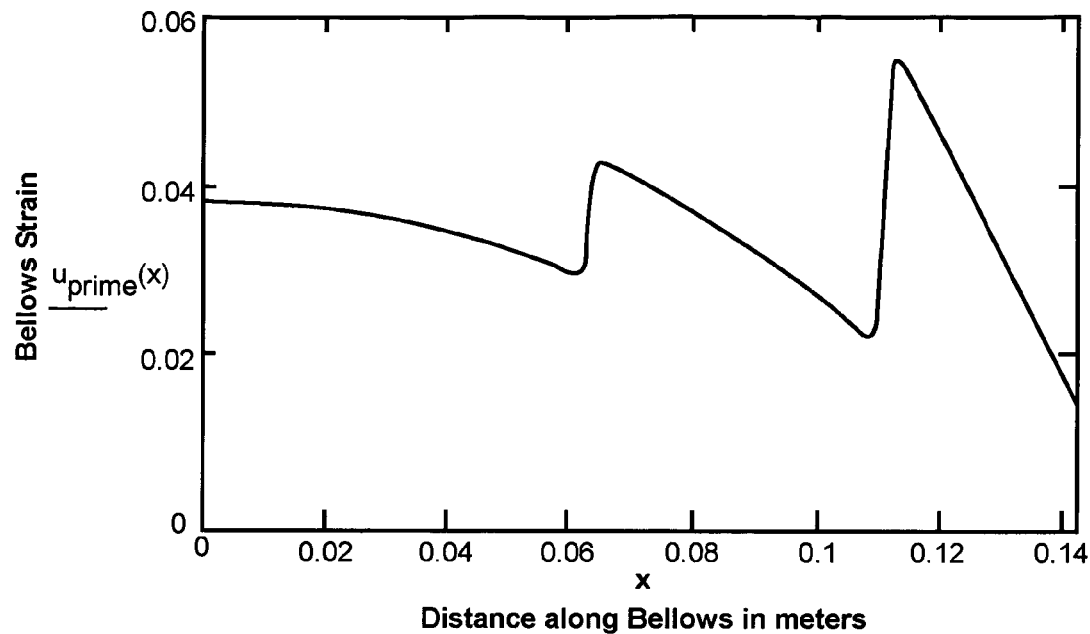
FIG. 15 is a graph showing bellows strain versus position along the bellows.
Figure 16:
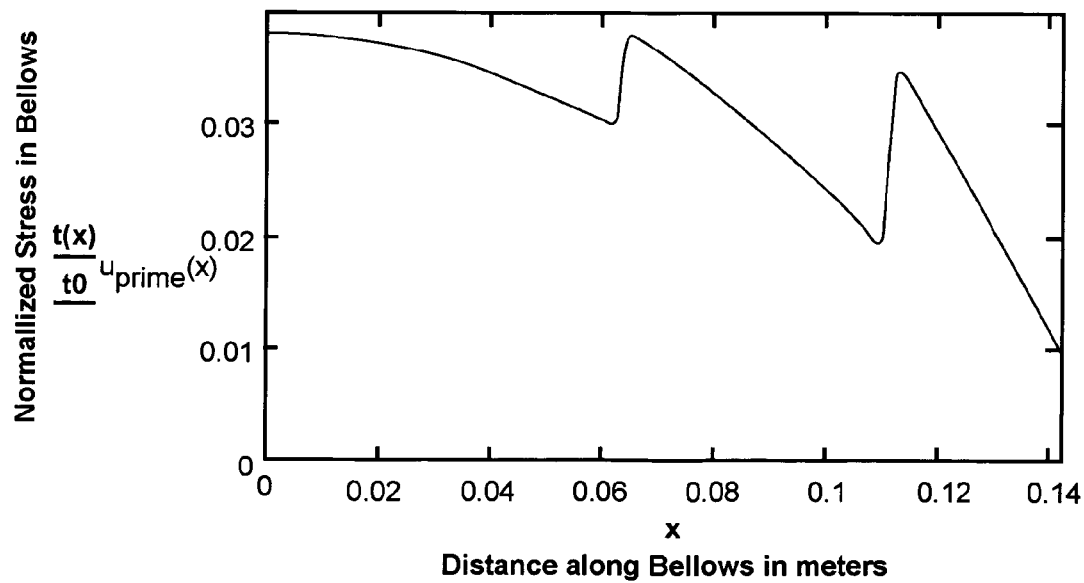
FIG. 16 is a graph showing normalized stress versus position along the bellows.

Numerical Solution of Boundary Value Problem, After Assumption of Harmonic Excitation:

Given $$u''(x) \cdot E(x) + u'(x) \cdot E_{prime}(x) + \rho_\omega \cdot \left(\left|\frac{E(x)}{E_0}\right|\right)^{\frac{1}{3}} \cdot u(x) = 0$$

u(0) = 0                           Boundary Values
u(l) = .005
u := Odesolve (x, .2, 20000)       x := 0, .0001 . . . (0.2)

$$u_{prime}(x) := \frac{u(x + .0001) - u(x)}{.0001}$$     Numerical Evaluation of Strain in Bellows $u_{prime}(0) = 0.0383132$             Strain at Fixed End of Bellows FIG. 14 provides bellows displacement versus position along the length for the example of Table 3, and FIG. 15 provides bellows strain versus position. FIG. 16 provides the normalized stress profile.

As will be clear to those of skill in the art, any number of other incremental changes to the bellows geometry could be made. For analysis purposes, the incremental changes should be able to be sufficiently described mathematically. For example, the sections of the bellows may each have their own pitch, thickness and convolution height, as long as a reasonable mathematical joining condition can be composed, of the sort seen in the above example.

Figure 17:
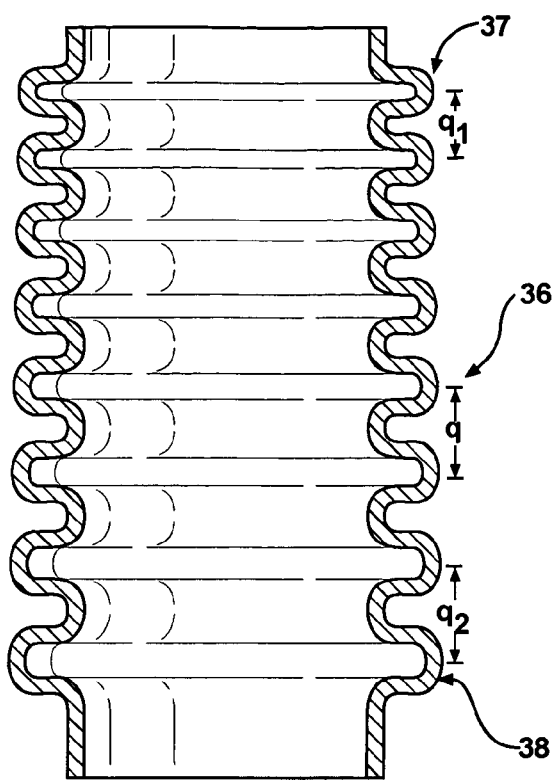
FIG. 17 is a cross-sectional view of a bellows according to another embodiment of the present invention wherein the convolution spacing changes from end to end.

One of skill in the art will appreciate that the stiffness and/or linear density may be altered in other ways, either continuously or incrementally. FIG. 17 illustrates a bellows 36 wherein the convolution pitch, q, varies along the length. At one end 37 the pitch is $q_1$, and at the other end 38 the pitch is $q_2$, which is greater than $q_1$. The pitch may vary continuously, or incrementally, though it is preferred that it vary generally monotonically so that the stiffness and/or linear density varies generally monotonically.

Figure 18:
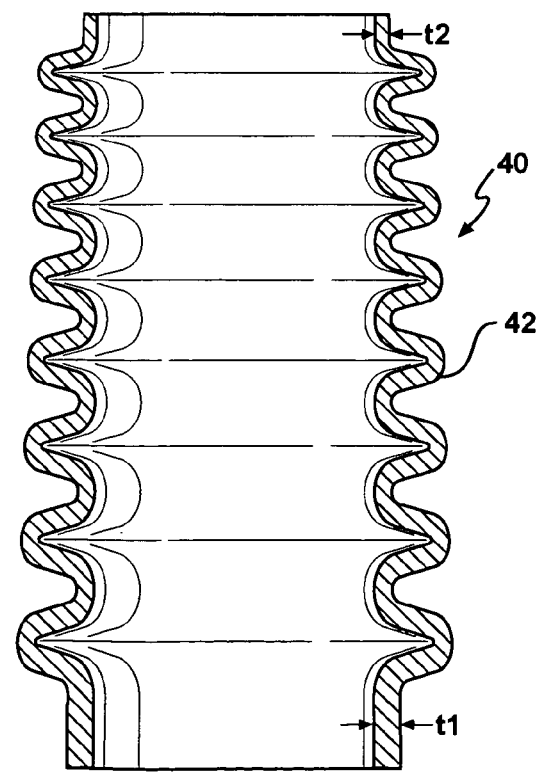
FIG. 18 is a cross-sectional view of a bellows according to an alternative embodiment of the present invention wherein the convolutions have an alternative shape.

The bellows may also have convolutions with shapes or profiles different than illustrated so far. As one example, FIG. 18 shows a bellows 40 wherein the outer ends 42 of the convolutions have sharper transitions than in the prior versions. This is just one example. Other examples will be clear to those of skill in the art. The bellows 40 also has a wall thickness that varies between a thick wall $t_1$ and a thin wall $t_2$, with the thicknesses being exaggerated in the drawings.

Figure 19:
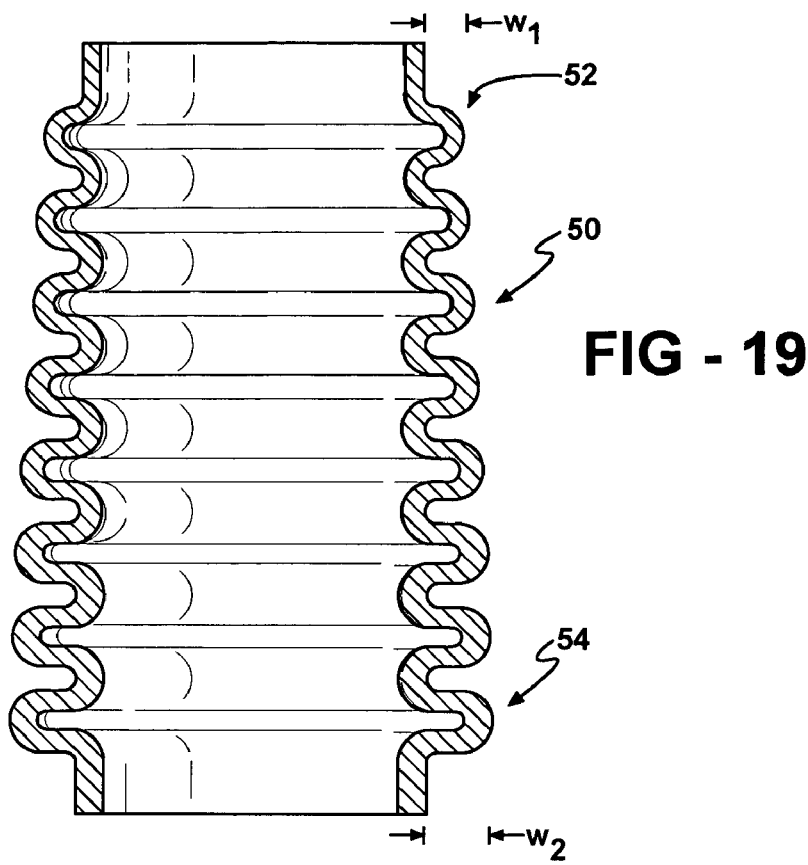
FIG. 19 is a cross-sectional view of a bellows according to yet another embodiment of the present invention wherein the convolution height or span varies along the length of the bellows.

One of skill in the art can examine equations (A.11) and (A.12) and note that for a formed bellows, by increasing the convolution height or span, w, towards the moving end, one can also produce a bellows with a compliance which increases as one moves toward the piston (moving end). This is a further alternative to varying the thickness. FIG. 19 shows such a bellows 50. The bellows 50 has a convolution height or span that varies from $w_1$ at one end 52 to $w_2$ at the other end 54. Such a solution obviates the need for variable thickness material or additional welds. From a performance point of view, this method offers more modest improvement over a conventional bellows, because increasing compliance comes at the cost of increasing linear mass density, since taller convolutions carry more material.

As a further alternative, a bellows may combine any or the approaches discussed above, so as to vary the stiffness and/or linear mass density along the length of the bellows.

Hoop-Stack Bellows

Figure 20:
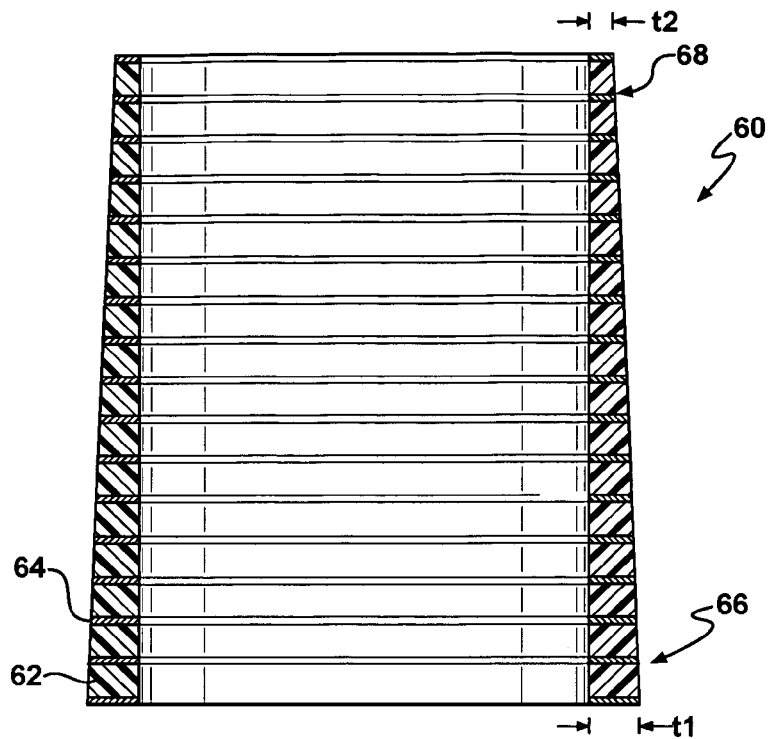
FIG. 20 is a cross-sectional view of a bellows according to yet another alternative embodiment of the present invention wherein the bellows is generally tubular.

As discussed previously, a bellows according to the present invention may take forms other than a traditional bellows with convolutions. According to yet another embodiment of the present invention, such a bellows may take the form shown in FIG. 20. The bellows 60 is generally tubular and has a layered structure. It one embodiment, the bellows has lamina perpendicular to the axis of compression, consisting of alternating high compliance and low compliance layers. The high compliance layers 62 may be elastomeric layers, to provide axial compliance. The low compliance layers 64, such as metal hoops, may have high resistance to internal and external pressure. In one example, the low compliance layers are flat aluminum hoops. Other materials, for this an other embodiments, include but are not limited to composites, thermo-formed plastics and thermo-set plastics. The low compliance layers provide resistance to pressure loads, which are transmitted from the elastomeric rings to the hoops via shear. The layers may be bonded to each other with a suitable adhesive or other bonding arrangement. Naturally, the bellows has an internal diameter and an outside diameter, and the shape for this example may be generally cylindrical.

Figure 21:
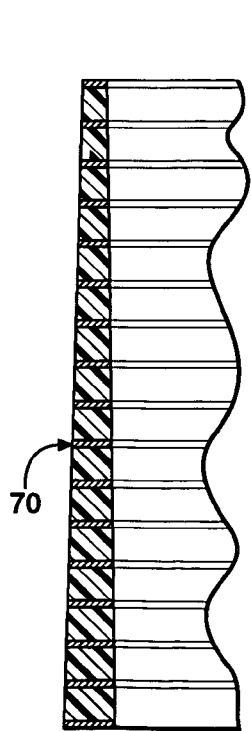
FIG. 21 is a cross-sectional view of a portion of the bellows wall showing an alternative configuration.

As with the earlier embodiments, the bellows preferably has a stiffness and/or linear mass density that varies monotonically, either continuously or incrementally, between the ends. This variation may be accomplished in several ways, as will be clear to those of skill in the art. The bellows 60 has a wall thickness that varies between t1 at one end 66 and t2 at the other end 68. In this embodiment, the inner surface is cylindrical, and the outer surface is tapered. FIG. 21 illustrates a portion of a bellows wall 70 wherein the inner and outer surfaces both taper.

Figure 22:
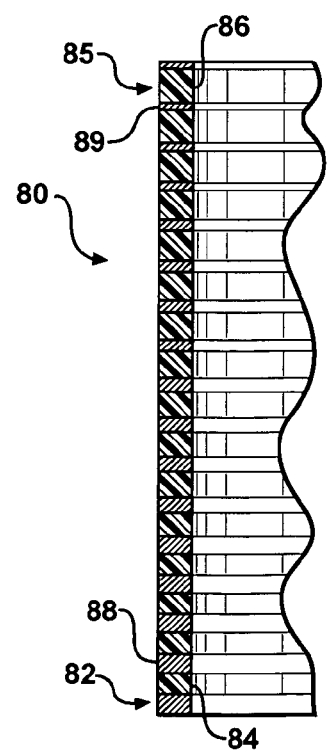
FIG. 22 is a cross-sectional view of a portion of a bellows wall showing yet another alternative configuration.

An alternative approach is to vary the thicknesses of the layers. FIG. 22 shows a portion of a bellows 80 wherein the high compliance layers vary from thin to thick, and the low compliance layers vary from thick to thin. For example, at one end 82, the high compliance layer 84 is relatively thin, while at the other end 85, the high compliance layer 86 is thicker. The low compliance layer 88 at the one end 82 is relatively thick while the low compliance layer 89 at the other end 85 is thinner.

Figure 23:
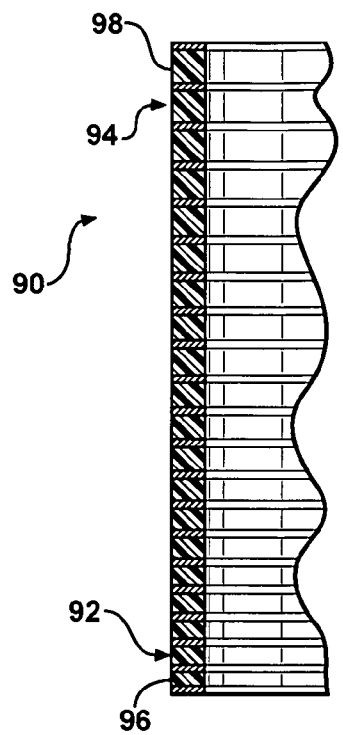
FIG. 23 is a cross-sectional view of a portion of a bellows wall showing a further alternative configuration.

FIG. 23 shows a simpler alternative wherein the variation in properties is provided by changing the height of the elastomeric material, and keeping the thickness of the aluminum hoops fixed. As shown, the bellows wall 90 has opposed ends 92 and 94. The elastomeric material layer 96 near the end 92 is thinner than the elastomeric layer 98 near the other end 94. This particular example will be used to provide sample calculations and to illustrate some of the interaction between the pressure and deflection stresses, and how a designer may approach these considerations. In the design example chosen, a particular value of pressure and maximum interface shear stress are implicit in the dimensions selected, the exact values of which are peripheral to the conceptual thrust. Values and calculations are provided in Table 4.

TABLE 4

Examination of Variable Hoop-stack Bellows Done via varying thickness of elastomer layer only (fixed height elastomer layers)

Begining point will be assumption that max height is controlled by pressure (interface shear) that therefore the tailoring will be done to stiffen by thinning the layer height near the fixed end. Treat per unit area (m^2) of bellows material Elastomer Free Youngs Modulus  $E_3 := 1.54 \times 10^6 \cdot Pa$ Elastomer, Hoop Density   $\rho_e := 1100 \frac{kg}{m^3}$   $\rho_h := 2700 \frac{kg}{m^3}$ Max elastomer height   $h_{max} := .160\ in$
Elastomer thickness   $t := .0181 \cdot in$
Minimum elastomer height   $h_{min} := h_{max} \cdot (.5)$
Ring Height   $h_h := 0.040\ in$
Bellows height   $L := 8 \cdot 0.0254$   Leaving non dimensional
Elastomer profile (This can be tailored--only has to be mathematical differentiable if want to use continuous differential equation solver)

$$h(x) := h_{min} + (h_{max} - h_{min}) \cdot \left(\frac{x}{L}\right)^2 \qquad h(L) = 4.064 \times 10^{-3}\ m$$

Effective modulus of elastomer/stack as a function of position $$E(x) := \left[\left(\frac{4}{3}\right) + \left(\frac{t}{h(x)}\right)^2 \cdot \frac{1}{3}\right] \cdot \frac{h(x) + h_h}{h(x)} \cdot E_e$$

Effective local density $$\rho(x) := \left(\frac{h(x) \cdot \rho_e + h_h \cdot \rho_h}{h(x) + h_h}\right)$$

Temporarily non-dimensionalize E(x)
$E_n(x) := E(x) \cdot \frac{1}{Pa}$   $\rho_n(x) := \rho(x) \cdot \frac{m^3}{kg}$   $\omega_n := \omega \cdot s$ Given $$\frac{d^2}{dx^2}\xi(x) \cdot E_n(x) + \frac{d}{dx}\xi(x) \cdot \frac{d}{dx}E_n(x) + \omega_n^2 \cdot \rho_n(x) \cdot \xi(x) = 0$$

$\xi(0) = 0$   Boundary Values for displacement
$\xi(L) = 0.010$
$\xi := Odesolve(x, L \cdot 1.1, 2000)$   This $\xi$ represents displacement $\varepsilon(x) := \frac{d}{dx}\xi(x)$   Local Strain is equal to derivitive with respect to displacement $X := 0, .001 \ldots L$
$\epsilon(.0001) = 0.048$
$\epsilon_u(.0001) = 0.077$
Average Elastomer Strain $\varepsilon_{ue}(x) := \varepsilon_u(x) \cdot \frac{h(L) + h_h}{h(L)}$   $\varepsilon_e(x) := \varepsilon(x) \cdot \frac{h(x) + h_h}{h(x)}$   $\frac{h(0)}{h(L)} = 0.5$ $\epsilon_e(.0001) = 0.072$   $\epsilon_{ue}(.0001) = 0.096$
Peak Local Deflection Strain $\varepsilon_{up}(x) := \varepsilon_u(x) \cdot \left(\frac{h(L) + h_h}{h(L)}\right) \cdot 3 \cdot \left(\frac{t}{h(L)}\right)$   $\varepsilon_p(x) := \varepsilon(x) \cdot \left(\frac{h(x) + h_h}{h(x)}\right) \cdot 3 \cdot \left(\frac{t}{h(x)}\right)$ Peak Local Deflection Strain + Pressure strain   $p_e := .6$ $\varepsilon(x) := \varepsilon_u(x) \cdot \left(\frac{h(L) + h_h}{h(L)}\right) \cdot 3 \cdot \left(\frac{t}{h(L)}\right) + p_e$   $\varepsilon(x) := \varepsilon(x) \cdot \left(\frac{h(x) + h_h}{h(x)}\right) \cdot 3 \cdot \left(\frac{t}{h(x)}\right) + \left(\frac{h(x)}{h(L)}\right) \cdot p_e$ $\epsilon_{up}(0.0001) = 0.927$
$\epsilon_p(.0001) = 0.789$   $\frac{\varepsilon_p(0.0001)}{\varepsilon_{up}(0.0001)} = 0.85$ In the example in Table 4, it can be seen that a value of the modulus of the elastomer has been chosen—in this case comparable with a natural rubber with a durometer of approximately 40. The density of the hoops and the elastomer follow within the Table. The density chosen for the hoops (2700 kg/m$^3$) corresponds to that of aluminum; generally in the Table, parameters associated with the hoops (the very low compliance lamina) are written with h as a subscript. The elastomer 'thickness' in the Table shall mean the difference between the inside diameter and the outside diameter of the bellows. The elastomer maximum height, in this case is a value determined by the pressure stresses that the elastomer can successfully transmit to the aluminum hoops without problems associated with excessive interface stress. "Minimum Elastomer height" here, is a parameter to be optimized for the operation of the bellows—a factor of ½ of the maximum has been chosen for simplicity in this example and further refinement can be obtained. An "Elastomer profile" is given in this example; in this particular case, again for simplicity in illustrating the approach, a parabolic height profile has been chosen, with the elastomer increasing in height by a factor-of-two over the length of the bellows. Clearly, any function, which can be mathematically described in at least an approximately continuous fashion could be used, as illustrated in the previous example. Even with such fairly simple illustrative approaches, it will be seen that the bellows is improved, and further improvement is possible.

Figure 24:
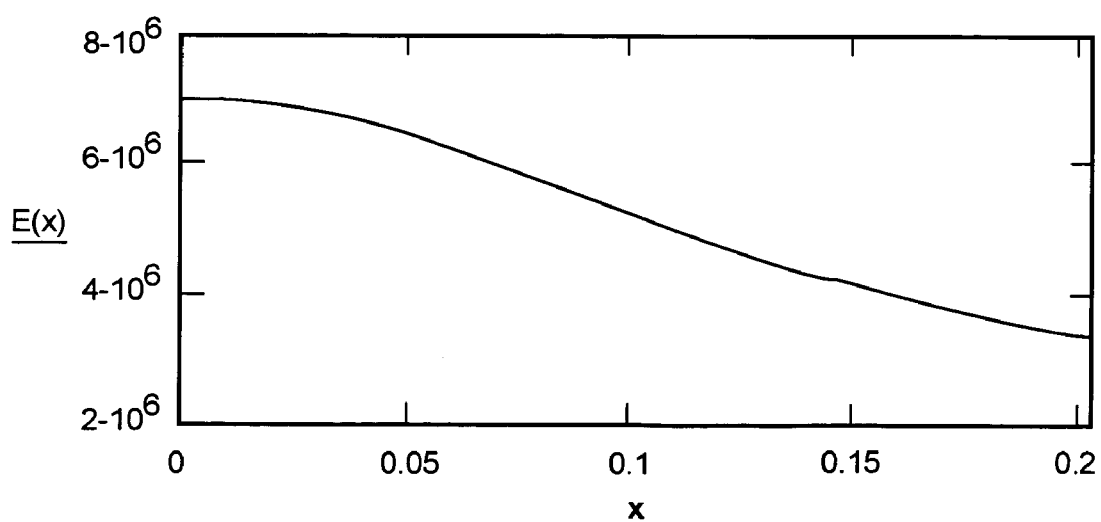
FIG. 24 is a graph showing effective modulus versus position along the bellows.
Figure 25:
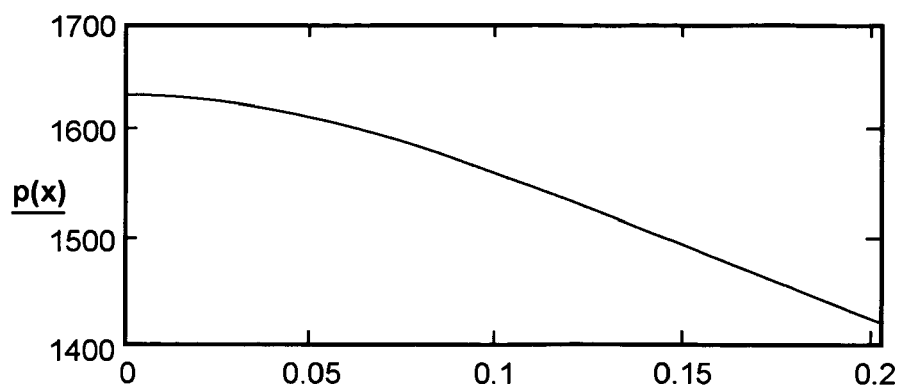
FIG. 25 is a graph showing density versus position along the bellows.

In keeping with the method described above, we must find the stiffness as a function of length. In this particular type of design, one must be aware that the effective modulus of the bellows is a function of the aspect ratio (height to thickness ratio) bellows type. Details on this can be found in A. N. Gent and P. B. Lindley, "The Compression of Bonded Rubber Blocks", Proc. Inst. Mech. Eng. (London) Vol 173, No. 3, pg 111-122. (1959). When an elastomer is bonded to a non-compliant material, it can be shown that in compression and tension, the effective modulus of the elastomer is a function of the aspect ratio (thickness to height ratio.) Further, the local bellows stiffness depends on the fraction of material (in this case the aluminum hoops) which have effectively infinite relative stiffness in comparison with the fraction which is elastomeric. These two features are incorporated in the formulation described as the "Effective modulus of elastomer/stack as a function of position" in the design example, and is plotted in FIG. 24. A similar density profile is also constructed within the Table and plotted in FIG. 25.

To proceed further, we must next choose an operating frequency, here chosen as 60 Hz, for purposes of illustration. Given these results, application of Newtons second law to differential elements along the bellows, and assumption of harmonic motion of one of the ends, produces the differential equation indicated in terms of x (x), the displacement of each section, which is subject then to boundary conditions—zero displacement at the fixed end and a finite time harmonic displacement at the moving end.

Figure 26:
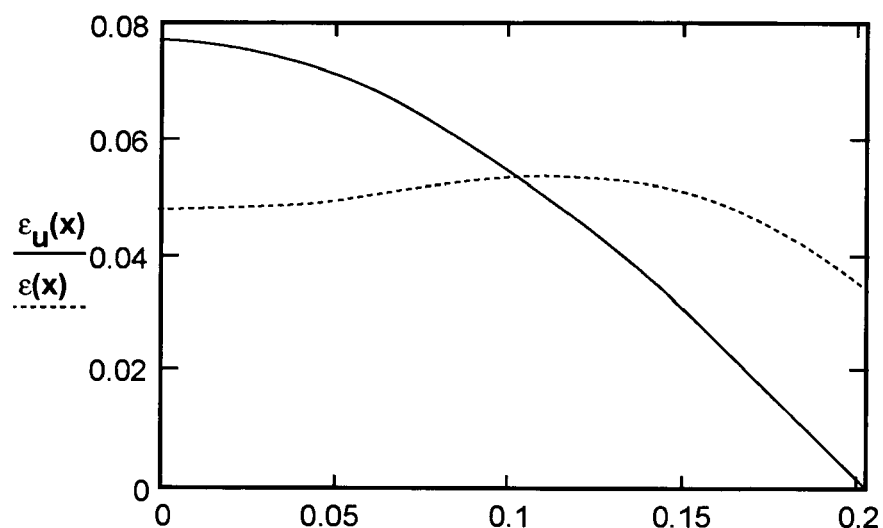
FIG. 26 is a graph showing strain versus position along the bellows.

FIG. 26 shows the improvement in the strain, the dashed case representing the case with tailored stiffness and the solid line represents that with a uniform bellows (i.e. constant height elastomer layers). Here we can see the type of reduction in strain already illustrated in the previous design examples. In this, and all examples which follow, the values with a subscript u will refer to a reference uniform bellows calculations, provided to use only as a basis for comparison to judge the relative sizes of strains and the design benefit conveyed.

Figure 27:
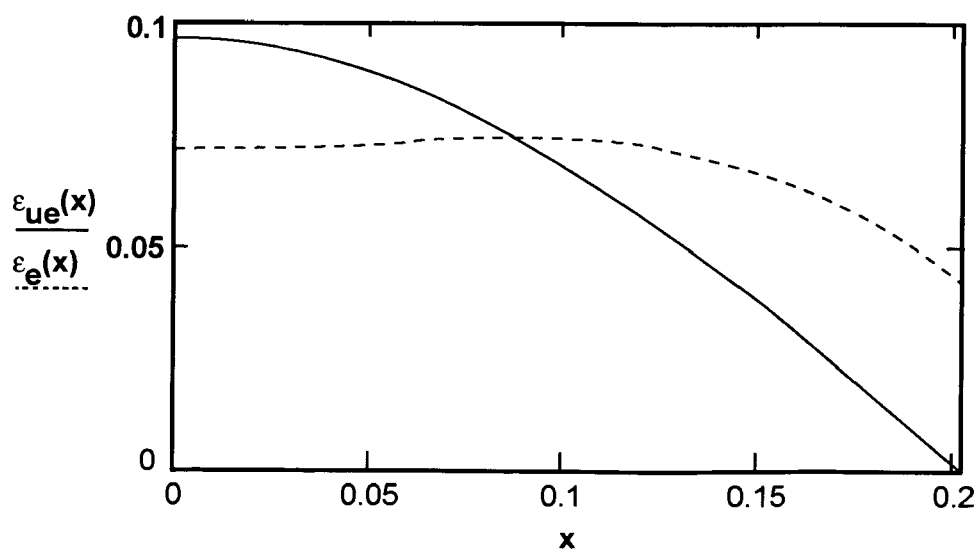
FIG. 27 is a graph showing elastomer strain versus position along the bellows.

From this point, one must now consider the details of the construction. Because a constant local strain would not represent a constant local stress in such a structure, one must convert this strain back to the strain experienced by the elastomer, since the hoops experience no significant strain. This effect is illustrated in FIG. 27

Figure 28:
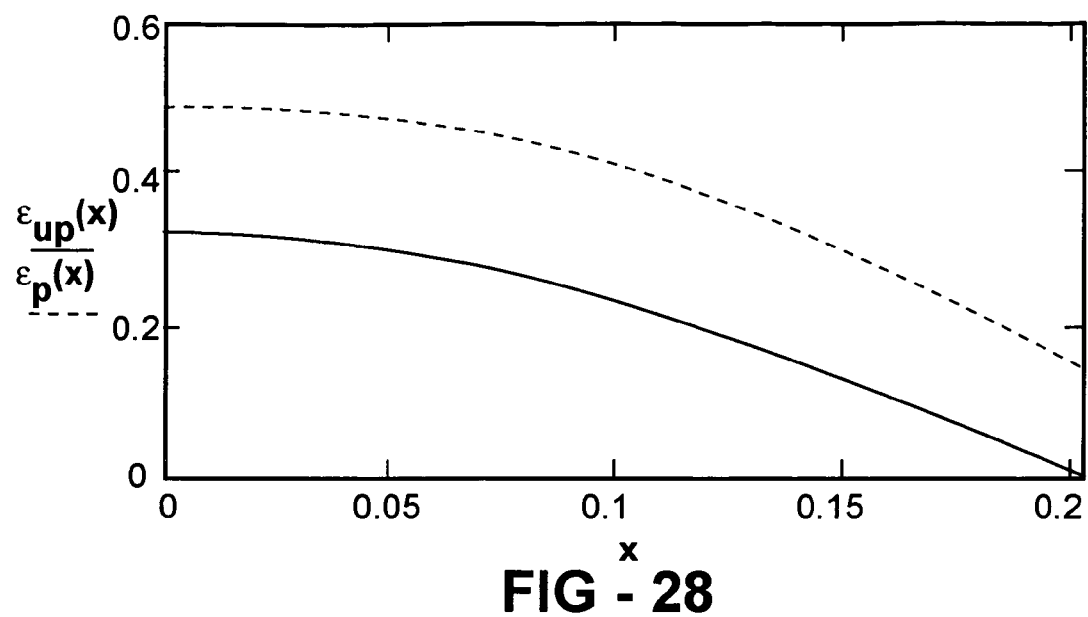
FIG. 28 is a graph showing strain versus position along the bellows.

Now, a peculiarity of this type of structure can enter. It can be shown that a localized strain concentration occurs in the rubber in such a compressed and expanded structure, which also depends on the aspect ratio of the elastomer. In some cases this peak local stress will govern the design, but it may not always, and this depends on the details of the material and construction. But for purposes of illustration, we shall assume it does in this case, and this strain concentration is calculated in the parameter labeled $e_p$ (x), with the equation given in the Table. This calculation represents the strain at the location of maximum shear, near the interface of the lamina, associated with the constraint provided by the bonding at the interface, and the fact that the rubber material will conserve its volume. When this peak strain is calculated as described here, the peak local deflection strain, as a function of position is actually higher than the uniform bellows case; in the absence of a means to ameliorate this effect it would appear that this approach has yielded a lower performing bellows. This is show in FIG. 28.

Figure 29:
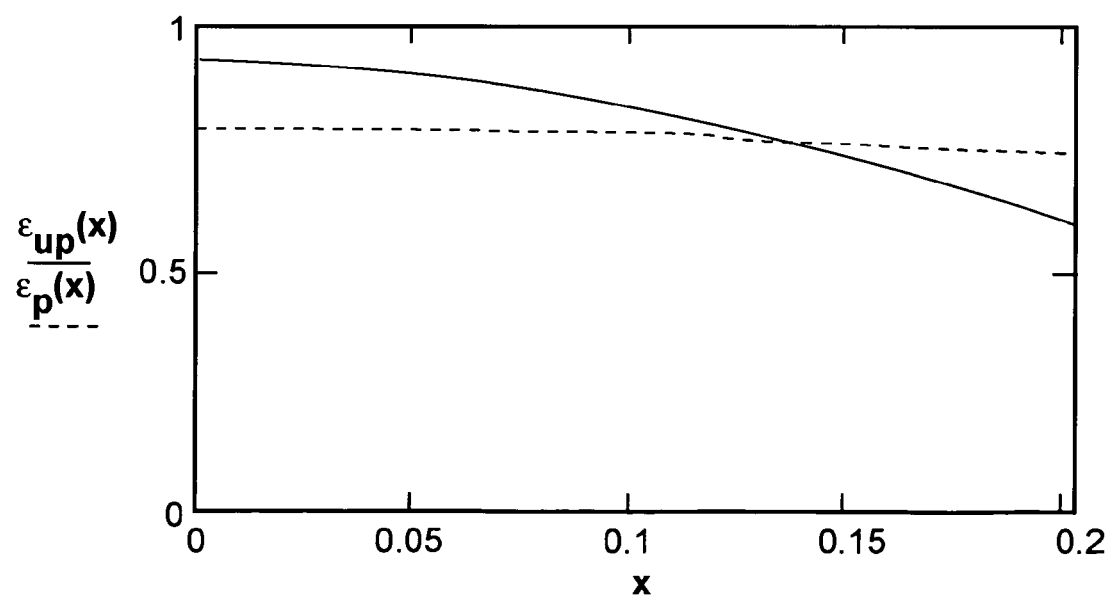
FIG. 29 is a graph showing strain versus position along the bellows.

One must also however at some point consider the interaction of the pressure stresses as well. For a design of this type, when the elastomeric layers have lower height, one can see that the shear stresses associated with the pressure, which are transferred over the interface to the hoops are lower than those of a uniform height bellows. In fact, this shear is simply inversely proportional to the height of the elastomeric layer. As such, the pressure stress is one half as large at one end of the bellows as it is at the other, due to this stiffness tailoring. For a particular chosen value of the pressure, the sum of these effects is shown in FIG. 29.

In summary for this example, while we observe very good improvement by tailoring the stiffness in the global strain profile, peculiarities of the construction resulted in localized stress concentrations, which happened to conspire to reduce the benefit from the initial deflection optimization. Unless otherwise ameliorated, when taken in consideration with pressure stresses, a net benefit was afforded to the bellows with a variation in stiffness, using the method described herein. Of course, this bellows also does not have higher order modes with associated modal frequencies which are integer multiples of the fundamental, which also represents an improvement when the driving function is only approximately sinusoidal, as might occur for a number of reasons mentioned above.

It should be clear that the general principle of these illustrative examples can be applied to a range of possible bellows types. For example, one could achieve the desired variation of properties in a bellows of the type described in U.S. Pat. No. 6,755,027, through variation in the material properties of the elastomeric sealant, by tapering the wall thickness, or changing the dimensions in the elements which make up the cylindrical spring. Other means may also exist.

Figure 30:
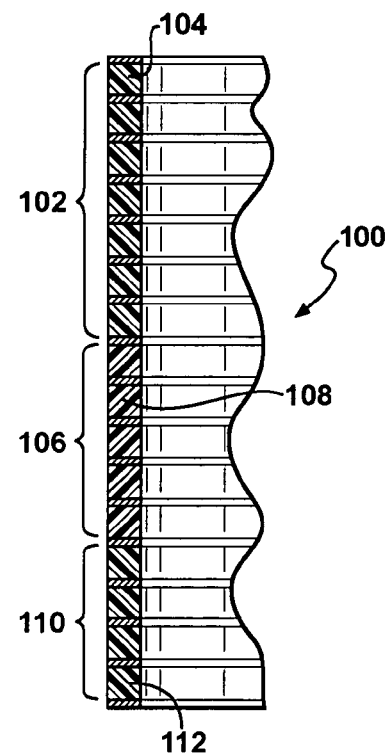
FIG. 30 is a cross-sectional view of a portion of a bellows showing another alternative configuration.
Figure 31:
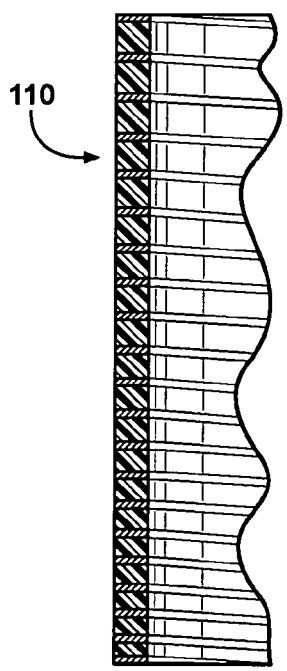
FIG. 31 is a cross-sectional view of a portion of a bellows according to yet a further embodiment of the present invention.

Another type of bellows in which similar property variation could be accomplished consists of a stack of alternating metallic and elastomeric layers. More generally, such a structure could be any two materials, such that one has high compliance, and the other has high stiffness: the former to permit axial compression and the latter to provide resistance to buckling from pressure differential from the inside to the outside of the bellows. In such a composite structure, consisting of alternating materials of high compliance and low compliance, the improvement described herein can be achieved via varying the ratio of thicknesses in the materials from one end of the bellows to the other, by use of a range of a range of compliant materials with different stiffness and density along the axis of the bellows, or again, by variation of the wall thickness. FIG. 30 shows a portion of a bellows 100 wherein different high compliance materials are used in different layers. For example, section 102 has layers 104 with a first compliance, section 106, has layers 108 with a second compliance, and section 110 has layers 112 with a third compliance. Of course combinations of the above may also be employed, and this list is not exhaustive Similar improvements can be made if the structure consists, instead of independent layers of low compliance material and high compliance material, of a helical coil spring with an elastomeric material filling the spaces between the coils. A portion of a bellows 110 with such a design is shown in FIG. 31. This design accomplishes in function the same goal as described in the previous example, wherein the stiffness variation could be achieved via a variation in the pitch of the spring, so as to accomplish a change in stiffness, similar to the means described in the layered structure. The wall thickness could also be varied, or other combinations made. As a further alternative, a tubular bellows formed of only one material, without the low compliance layers or spiral, could be formed with varying stiffness or density.

It should be noted for the improved exemplary cases described above, and for other embodiments of the present invention, that a linear stiffness profile is not an essential element of the invention. Other mathematical formulations may be equally suitable which are polynomial, can be approximated by polynomials or have other reasonably continuous forms suitable for numerical integration, such as the 'step-wise' incremental thickness case discussed above. In general, the improved solutions require only monotonically decreasing stiffness/and or mass per unit length which decreases from the fixed end to the moving end, the exact nature of which will depend on the particular type of generalized bellows construction, and numerical evaluation using the approach outlined here. Additionally, a profile that is not easily formulated mathematically may be useful, even though it is difficult or impossible to analyze in the same way as the examples herein.

For any type of bellows, the method described herein may be used to reduce the stresses in the bellows, to increase the fatigue resistance, permit use of less material or less expensive material, or permit a larger piston displacement than the equivalent prior art, since the stress curves produced are linearly proportional to the end deflection.

A further advantage of such variable stiffness/density bellows, is that they do not have resonance frequencies which lie on integer multiples of the drive frequency, as is true for the prior art frequency optimized bellows. The resonance frequencies for the prior art conventional bellows lie on multiples of the operating frequency, and the bellows resonances could potentially be excited due to non-linear behavior in the linear motor, or other parts. The latter means that the designer of a thermoacoustic device may not need to be as concerned about excitation of higher order bellows resonance frequencies, associated with non-linearities in the linear motor or other aspects of the device by an improved bellows, as described.

I claim:

1. A bellows comprising:
a generally tubular elongated bellows body defined by a flexible wall generally enclosing a volume, the flexible wall having a first end and a second end with a midportion extending therebetween, the body having a cross sectional shape and a cross sectional dimension, the wall having an axial stiffness and an axial linear mass density;

wherein the cross sectional shape and dimension are generally constant between the first and second ends; and wherein the axial stiffness and/or axial linear mass density decreases generally monotonically from the first end, through the midportion and to the second end.

2. The bellows of claim 1, wherein the flexible wall has a thickness, the thickness decreasing generally monotonically such that the axial stiffness varies generally monotonically.

3. The bellows of claim 2, wherein the wall thickness decreases generally continuously between the first and second ends.

4. The bellows of claim 3, wherein the flexible wall has a plurality of corrugations disposed between the ends of the body, the corrugations being generally perpendicular to an axis of the body, each corrugation having substantially the same height.

5. The bellows of claim 3, wherein the bellows body has an inner and outer surface, at least one of the surfaces being tapered such that the distance between the inner and outer surfaces varies between the ends of the body.

6. The bellows of claim 5, wherein the bellows body comprises alternating layers of low compliance material and high compliance material.

7. The bellows of claim 6, wherein the high compliance material is an elastomeric material and the low compliance material is a metal, the metal layers taking the form of generally parallel metal hoops.

8. The bellows of claim 3, wherein the wall thickness decreases as $x^{1/3}$, wherein x is the distance from one of the ends.

9. The bellows of claim 2, wherein the wall thickness at one end of the body is approximately half the wall thickness at the other end of the body.

10. The bellows of claim 2, wherein the flexible wall is defined by a spiral of low compliance material with gaps between the loops of the spiral filled with a high compliance material.

11. The bellows of claim 1, wherein the wall thickness varies stepwise between the first and second ends.

12. The bellows of claim 11, wherein the wall thickness varies stepwise and the bellows has at least a first section, a second section, and a third section joined together longitudinally, the first section having a first generally constant wall thickness, the second section having a second generally constant wall thickness, the third section having a third generally constant wall thickness, the thickness of each of the sections being different.

13. The bellows of claim 11, wherein the bellows body comprises alternating layers of low compliance material and high compliance material.

14. The bellows of claim 13, wherein the high compliance material is an elastomeric material and the low compliance material is a metal, the metal layers taking the form of generally parallel metal hoops.

15. The bellows of claim 1, wherein the flexible wall has a plurality of corrugations spaced apart between the ends of the body, the corrugations being generally perpendicular to an axis of the body, each corrugation having substantially the same height.

16. The bellows of claim 15, wherein the spacing between the corrugations varies generally monotonically between the first and second ends of the body such that the axial stiffness of the body decreases generally monotonically between the first and second ends.

17. The bellows of claim 1, wherein at least one of the inner and outer surfaces of the bellows body is tapered such that the distance between the inner and outer surfaces varies between the ends of the body.

18. The bellows of claim 1, wherein the bellows body comprises alternating layers of low compliance material and high compliance material, each layer having a height, the height of the high compliance material layers varying generally monotonically between the first and second ends of the body such that the axial stiffness of the body decreases generally monotonically between the first and second ends.

19. The bellows of claim 18, wherein the height of the low compliance layers varies generally monotonically between the first and second ends of the body.

20. The bellows of claim 18, wherein the height of each of the low compliance layers is substantially the same.

21. The bellows of claim 18, wherein the high compliance material is an elastomeric material and the low compliance material is a metal, the metal layers taking the form of generally parallel metal hoops.

22. The bellows of claim 1, wherein the flexible wall is defined by a spiral of low compliance material with gaps between the loops of the spiral filled with a high compliance material.

23. The bellows of claim 22, wherein the gaps between the loops of the spiral each have a height, the height of the gaps varying generally monotonically between the first and second ends of the body such that the axial stiffness of the body decreases generally monotonically between the first and second ends.

24. The bellows of claim 22, wherein the high compliance material is an elastomeric material and the low compliance material is a metal.

25. The bellows according to claim 1, wherein the first end is a fixed end and the second end is a movable end, the stiffness and/or linear mass density decreasing between the first end and the second end.

26. The bellows of claim 25, wherein the decrease in stiffness and/or linear mass density is generally linear.

27. The bellows of claim 1, further comprising a collar interconnected with one of the ends.

28. The bellows of claim 27, further comprising a second collar interconnected with the other of the ends.

29. The bellows of claim 1, wherein the cross sectional shape of the bellows body is generally circular.

30. The bellows of claim 1, wherein the axial stiffness decreases generally linearly.

31. A bellows comprising:
a generally tubular elongated bellows body defined by a flexible wall generally enclosing a volume, the flexible wall extending between and terminating at a first end and a second end, the body having a cross sectional shape and a cross sectional dimension, the wall having an axial stiffness and an axial linear mass density;
wherein the cross sectional shape and dimension are generally constant between the first and second ends; and
wherein the axial stiffness and/or axial linear mass density decreases generally monotonically from the first end to the second end.

32. The bellows of claim 31, wherein the bellows has at least a first and a second section joined together longitudinally so as to define the bellows body, the first section having a first generally constant wall thickness, the second section having a second generally constant wall thickness, the first thickness being different than the second thickness.

33. The bellows of claim 32, wherein the bellows is metal, the first and second sections being joined by a welded joint.

34. The bellows of claim 33, wherein each of the sections is corrugated, each corrugation having a flat portion between the crest and root, the welded joint being disposed on one of the flat portions.

35. The bellows of claim 31, wherein the bellows body comprises alternating layers of low compliance material and high compliance material, the bellows having at least a first and a second section joined together longitudinally so as to define the bellows body, the high compliance layers in the first section having a first compliance, the high compliance layers in the second section having a second compliance, the first compliance being different than the second compliance.

36. The bellows of claim 1, wherein the bellows has at least a first section, a second section, and a third section joined together longitudinally, the high compliance layers in the first section having a first compliance, the high compliance layers in the second section having a second compliance, the high compliance layers in the third section having a third compliance, the compliances of each of the sections being different.

\* \* \* \* \*

UNITED STATES PATENT AND TRADEMARK OFFICE
CERTIFICATE OF CORRECTION

PATENT NO. : 7,290,771 B2  Page 1 of 1
APPLICATION NO. : 11/116636
DATED : November 6, 2007
INVENTOR(S) : Robert W.M. Smith It is certified that error appears in the above-identified patent and that said Letters Patent is hereby corrected as shown below:

Column 4, Line 13, replace "non-increasing." with --non-increasing--

Column 8, Line 3, replace "will optimizes" with --will optimize--

Column 14, Line 64, replace "weld my" with --weld may--

Column 17, Line 65, replace "any or" with --any of--

Column 18, Line 27, replace "It one" with --In one--

Column 18, Line 34, replace "an other" with --and other--

Column 22, Line 25, replace "show" with --shown--

Column 23, Line 26, replace "stiffness/and or" with --stiffness and/or--

Signed and Sealed this

Twenty-ninth Day of April, 2008

JON W. DUDAS
*Director of the United States Patent and Trademark Office*